United States Patent
Bolla

(10) Patent No.: US 11,157,738 B2
(45) Date of Patent: Oct. 26, 2021

(54) AUDIO-VISUAL PERCEPTION SYSTEM AND APPARATUS AND ROBOT SYSTEM

(71) Applicant: CLOUDMINDS ROBOTICS CO., LTD., Shanghai (CN)

(72) Inventor: Bettina Bolla, Santa Clara, CA (US)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 16/206,845

(22) Filed: Nov. 30, 2018

(65) Prior Publication Data

US 2020/0175271 A1 Jun. 4, 2020

(51) Int. Cl.
| | |
|---|---|
| G06K 9/00 | (2006.01) |
| B25J 13/08 | (2006.01) |
| B25J 13/00 | (2006.01) |
| G06F 3/16 | (2006.01) |

(52) U.S. Cl.
CPC ........ *G06K 9/00664* (2013.01); *B25J 13/003* (2013.01); *B25J 13/08* (2013.01); *G06F 3/16* (2013.01)

(58) Field of Classification Search
CPC ........... G06K 9/00664; G06K 9/00221; G06K 9/00335; B25J 13/003; B25J 13/08; G06F 3/16; H04N 5/23245; H04N 5/23216; H04N 5/23218; H04N 5/23296; H04N 5/2258; H04N 5/23219; H04N 5/232935; H04N 5/232; H04N 5/23238; H04N 5/23293; H04N 5/232933; H04N 5/23229; H04N 5/232939; H04N 5/232945
See application file for complete search history.

(56) References Cited

U.S. PATENT DOCUMENTS

| | | | | |
|---|---|---|---|---|
| 8,718,837 B2 * | 5/2014 | Wang | ..................... | B25J 9/1689 |
| | | | | 701/2 |
| 10,091,429 B2 * | 10/2018 | Kim | ..................... | G06F 3/0412 |
| 10,412,342 B2 * | 9/2019 | Child | ................. | H04N 5/23212 |
| 10,498,944 B2 * | 12/2019 | Wexler | ..................... | G06F 3/038 |
| 2003/0160862 A1 * | 8/2003 | Charlier | ............... | H04N 5/2627 |
| | | | | 348/14.08 |
| 2011/0285808 A1 * | 11/2011 | Feng | ..................... | H04N 7/147 |
| | | | | 348/14.09 |
| 2012/0147204 A1 * | 6/2012 | Jeong | ................... | H04N 5/2258 |
| | | | | 348/211.11 |

(Continued)

*Primary Examiner* — Michael S Osinski
(74) *Attorney, Agent, or Firm* — Young Basile Hanlon & MacFarlane, P.C.

(57) ABSTRACT

An audio-visual perception system includes an audio perception module and a visual perception module, respectively receiving sounds and images of a subject and converting them into audio and visual signals. At least one of the above two modules is a first perception module having more than one working mode. A processing and control module controls the first perception module to switch a working mode thereof based on the audio or visual signals received from one of the two above modules other than the first perception module. An audio-visual perception apparatus having the audio-visual perception system is also disclosed, which can be used as a robot control unit (RCU) mounted onto a robot, allowing a human-in-the-loop robot operator to visually and audibly monitor the subject in a surrounding of the robot. The RCU can switch between a RCU mode and a cell phone mode.

20 Claims, 18 Drawing Sheets

(56) References Cited

U.S. PATENT DOCUMENTS

| | | | |
|---|---|---|---|
| 2014/0009561 A1* | 1/2014 | Sutherland | F16M 11/42 |
| | | | 348/14.05 |
| 2015/0237455 A1* | 8/2015 | Mitra | H04N 7/183 |
| | | | 381/92 |
| 2016/0026240 A1* | 1/2016 | Wexler | H04N 5/23258 |
| | | | 348/207.11 |
| 2016/0182856 A1* | 6/2016 | Child | G06K 9/00758 |
| | | | 348/14.16 |
| 2017/0026582 A1* | 1/2017 | Kim | H04M 1/0264 |
| 2017/0099462 A1* | 4/2017 | Tangeland | H04N 5/23219 |
| 2019/0191087 A1* | 6/2019 | Lee | H04N 5/23245 |
| 2019/0215446 A1* | 7/2019 | Nishimura | G03B 17/20 |
| 2019/0253633 A1* | 8/2019 | Kim | H04N 5/232933 |
| 2019/0289201 A1* | 9/2019 | Nishimura | H04N 13/20 |
| 2019/0337159 A1* | 11/2019 | Tokuda | H02K 7/116 |
| 2019/0379829 A1* | 12/2019 | Yonaha | G03B 15/00 |
| 2019/0394423 A1* | 12/2019 | Ishige | H04N 5/2628 |

* cited by examiner

AUDIO-VISUAL PERCEPTION SYSTEM AND APPARATUS AND ROBOT SYSTEM

TECHNICAL FIELD

The present disclosure relates generally to the field of human-machine interaction technologies, more specifically to the sub-field of robotic technologies, and more in particular to an audio-visual perception system, an audio-visual perception apparatus equipped with the audio-visual perception system, and a robot system containing the audio-visual perception apparatus.

BACKGROUND

As social robots or service robots are making steady progress towards performing daily tasks in homes and offices, one of the main challenges in the field is that they must be able to deal with complex and constantly changing environments.

One technology currently under rapid development to address this above challenge is to involve a human in the loop during execution of a complex and challenging task by a service robot, especially in situations where a human-in-the-loop operator's cognitive abilities are tapped to cope with conditions that are extremely complex or require decisions that are presently still difficult for automatic systems.

A robot control unit device (i.e. RCU, also known as robot controller) equipped with various sensors is sometimes employed by a human-in-the-loop robot operator, who can be at a console, either remotely or at a same venue but behind the scene, to perceive the environment of the robot which he/she is operating. For example, the robot control unit device may be equipped with one or more cameras allowing the human-in-the-loop robot operator to see people or objects at the surrounding of the robot, and/or equipped with one or more microphones allowing him/her to hear people speaking to the robot or the acoustic cues around the robot.

SUMMARY OF THE INVENTION

In a first aspect, the present disclosure provides an audio-visual system.

The audio-visual perception system comprises an audio perception module, a visual perception module, and a processing and control module that is communicatively coupled to each of the audio perception module and the visual perception module. The audio perception module is configured to receive sounds from a subject, and then to convert the sounds into audio signals. The visual perception module configured to receive images of the subject, and then to convert the images into visual signals.

It is further configured such that at least one of the audio perception module and the visual perception module is a first perception module having more than one working mode; and the processing and control module is configured to control the first perception module to switch a working mode thereof based on sensory signals received from one of the audio perception module and the visual perception module other than the first perception module, wherein the sensory signals are one of the audio signals or the visual signals corresponding to the one of the audio perception module and the visual perception module other than the first perception module.

Optionally in the audio-visual perception system, the visual perception module can have more than one working mode, and the more than one working mode concerns at least one of different focusing ranges, different angles, light monochrome capabilities, capabilities of capturing light of different wavelengths, bokeh-effect capabilities, different apertures, different video capabilities, or different definitions.

Herein, according to some embodiments, the visual perception module comprises a normal-angle working mode and a wide-angle working mode, and the processing and control module is configured to control the visual perception module to switch on the normal-angle working mode if the audio signals received from the audio perception module indicate that the subject is within a first pre-determined range corresponding to the normal-angle working mode, or to control the visual perception module to switch on the wide-angle working mode if otherwise.

Herein, according to some other embodiments, the visual perception module comprises a near-field working mode and a far-field working mode, and the processing and control module is configured to control the visual perception to switch on the near-field working mode if the audio signals received from the audio perception module indicate that the subject is within a second pre-determined range corresponding to the near-field working mode; or to control the visual perception module to switch on the far-field working mode if otherwise.

Optionally in the audio-visual perception system, the audio perception module can have more than one working mode, and the more than one working mode concerns at least one of different levels of sensitivity, beam-forming capabilities, barge-in capabilities, different channel frequencies, different levels of noise reduction, acoustic cancellation capabilities, or automatic speech recognition capabilities.

Herein, according to some embodiments, the audio perception module comprises a short-range working mode and a long-range working mode, and the processing and control module is configured to control the audio perception module to switch on the short-range working mode if the visual signals received from the visual perception module indicate that the subject is within a third pre-determined range corresponding to the short-range working mode; or to control the audio perception module to switch on the long-range working mode if otherwise.

In any of the embodiments of the audio-visual perception system described above, the subject can be a human speaker, an animal, or an object capable of producing audio cues (e.g. sounds or noises, etc.) and visual cues (e.g. images or gestures, etc.). Herein the object can be a robot, a machine, etc.

According to some embodiments of the audio-visual perception system, the subject is a human speaker, and the sounds comprises a hot word uttered by the human speaker. As such, the visual perception module accordingly has more than one working mode, and the processing and control module is configured to control the visual perception module to switch a working mode thereof based on the hot word recognized by the processing and control module.

According to some other embodiments of the audio-visual perception system, the subject is a human speaker, and the images comprise gesture made by the human speaker. As such, the audio perception module accordingly has more than one working mode, and the processing and control module is configured to control the audio perception module to switch a working mode thereof based on the gesture recognized by the processing and control module.

In a second aspect, the present disclosure further provides an audio-visual perception apparatus, which includes an audio-visual perception system according to any one of the embodiments of the audio-visual perception system described above.

Herein, the audio-visual perception apparatus can be an integrated part of a robot configured to allow the robot to visually and audibly sense the subject in a surrounding of the robot.

The audio-visual perception apparatus can be configured as a robot control unit (RCU) having a mountable portion mounted onto a robot, wherein the audio-visual perception apparatus is configured to allow a human-in-the-loop robot operator to visually and audibly monitor the subject in a surrounding of the robot.

Herein, optionally the mountable portion can be detachable from the robot and switchable between an RCU mode allowing robot control and a cell phone mode allowing cell phone functionalities, and it is further configured such that the RCU mode is turned on and the cell phone mode is suppressed if the mountable portion is mounted onto the robot; and the cell phone mode is turned on and the RCU mode is turned off if otherwise, Furthermore, the audio-visual perception apparatus described above can optionally further include a user interface, which is configured to allow a user to switch an operation of the RCU apparatus between the RCU mode and the cell phone mode.

According to some embodiments, the mountable portion described above comprises a display panel, and the user interface is a graphic user interface (GUI) configured to display on the display panel.

According to some embodiments of the audio-visual perception apparatus, the visual perception module of the audio-visual perception system comprises a first camera device arranged on the mountable portion, and the audio perception module of the audio-visual perception system comprises a first microphone device arranged on the mountable portion.

Herein, optionally, the first camera device comprises at least two lenses, each with a different feature, and the different feature regarding (i.e. concerning, or comprising) at least one of different focusing ranges, different angles, light monochrome capabilities, capabilities of capturing light of different wavelengths, bokeh-effect capabilities, different apertures, different video capabilities, or different definitions.

Further optionally, in the audio-visual perception apparatus, the visual perception module of the audio-visual perception system further comprises a second camera device, which is positionally separated from, yet is also communicatively coupled with, the mountable portion.

According to some embodiments of the audio-visual perception apparatus, the first microphone device comprises a first microphone array having a plurality of first microphones, which are arranged respectively at different positions of the mountable portion.

Herein, each of the plurality of first microphones in the first microphone array can be an omnidirectional microphone, which is arranged on top of a rim of the mountable portion and is configured to be outward-facing or sideway-facing.

According to some embodiments of the audio-visual perception apparatus, the audio perception module of the audio-visual perception system further comprises a second microphone device, which is positionally separated from, yet is also communicatively coupled with, the mountable portion. The second microphone device can comprise a second microphone array having a plurality of second microphones.

According to some embodiments of the audio-visual perception apparatus, the first camera device comprises a normal-angle lens and a wide-angle lens, and the first microphone device is configured to allow a determination whether a sound source is within a normal-angle range, or within a wide-angle range, of the first camera device on the mountable portion, based on a sound therefrom. The processing and control module of the audio-visual perception system is configured to send a first command to the first camera device to thereby switch on the normal-angle lens if the audio signals received from the first microphone device indicate that the subject is within the normal-angle range, or configured to send a second command to the first camera device to thereby switch on the wide-angle lens if otherwise.

Furthermore, in the audio-visual perception apparatus described above, the first audio device can optionally comprise two microphones that are internally arranged at two different positions of the mountable portion.

According to some embodiments of the audio-visual perception apparatus, the first camera device comprises a near-field lens and a far-field lens, and the first microphone device is configured to allow a determination whether a sound source is within a near-field range, or within a far-field range, of the first camera device on the mounting device, based on a sound therefrom. The processing and control module of the audio-visual perception system is configured to send a third command to the first camera device to thereby switch on the near-field lens if the audio signals received from the first microphone device indicate that the subject is within the near-field range; or is configured to send a fourth command to the first camera device to thereby switch on the far-field lens if otherwise.

According to some embodiments of the audio-visual perception apparatus, the first microphone device and the second microphone device are respectively configured to operate in a short range and in a long range respectively, and the first camera device is configured to allow determination whether an object is within the short range of the first microphone device, based on an image thereof. The processing and control module of the audio-visual perception system is configured to send a fifth command to thereby switch on the first microphone device if the visual signals received from the first camera device indicate that the subject is within the short range; or is configured to send a sixth command to the second microphone device to thereby switch on the second microphone device if otherwise.

In a third aspect, a robot system is further disclosed.

The robot system comprises a robot, and an audio-visual perception apparatus that is based on any one of the embodiments of the audio-visual perception apparatus described above.

According to some embodiments, the robot system further comprises a mounting means, which is configured to mediate mounting of a mountable portion of the audio-visual perception apparatus to be mounted onto, or detached off from, the robot.

Herein, the mounting means can optionally comprise a first connecting part that is attached with the robot and a second connecting part that is attached with the first connecting part and is configured to securely hold the mountable portion of the audio-visual perception apparatus yet without influencing functionality of the audio-visual system.

According to some embodiments of the robot system, the audio-visual system comprises a first camera device and a first microphone device, both arranged on the mountable portion, and the second connecting part of the mounting means comprises a clamp, wherein the clamp comprises at least one clamping piece, configured such that none of the at least one clamping piece obstructs any lens of the first camera device or any microphone of the first microphone device.

Throughout the disclosure, each of the terms "module", "system", "interface", or alike, is referred to as a computer-implemented functional entity, which comprises at least one processor and a memory, wherein the memory is configured to store a software program (i.e. computer codes or executable instructions), and the at least one processor is configured to perform a calculation based on the software program stored in the memory to thereby perform a task carrying out the prescribed functionality. Furthermore, the at least one processor may include one or more controllers, general processors, specialized processors, coprocessors, etc., and the at least one processor can be arranged in a parallel processing structure and/or multiprocessing structure. In addition, each of the above terms may be a general computer having the software program, or can be a hardware computing device specifically designed for such a task. The computer and the hardware computing device can be locally arranged, or can be remotely arranged, such as on an intranet, an internet, or in a cloud.

Throughout the disclosure, each of a method, a step, a sub-step, a process and a feature, etc., may be implemented as part of an operating system or a specific application, component, program, object, module, or series of instructions referred to as "programs". For example, one or more programs may be used to execute specific processes described herein. The programs typically comprise one or more instructions in various memory and storage devices in a computer system that, when read and executed by at least one processor, cause the computer system to perform operations to execute the method, the step, the sub-step, the process, and the feature, etc. Each of a method, a step, a sub-step, a process and a feature, etc., may be implemented in software, firmware, hardware (e.g., an application specific integrated circuit), or any combination thereof.

BRIEF DESCRIPTION OF DRAWINGS

To more clearly illustrate some of the embodiments disclosed herein, the following is a brief description of drawings. The drawings in the following descriptions are only illustrative of some embodiments. For those of ordinary skill in the art, other drawings of other embodiments can become apparent based on these drawings.

DETAILED DESCRIPTION

Figure 1:
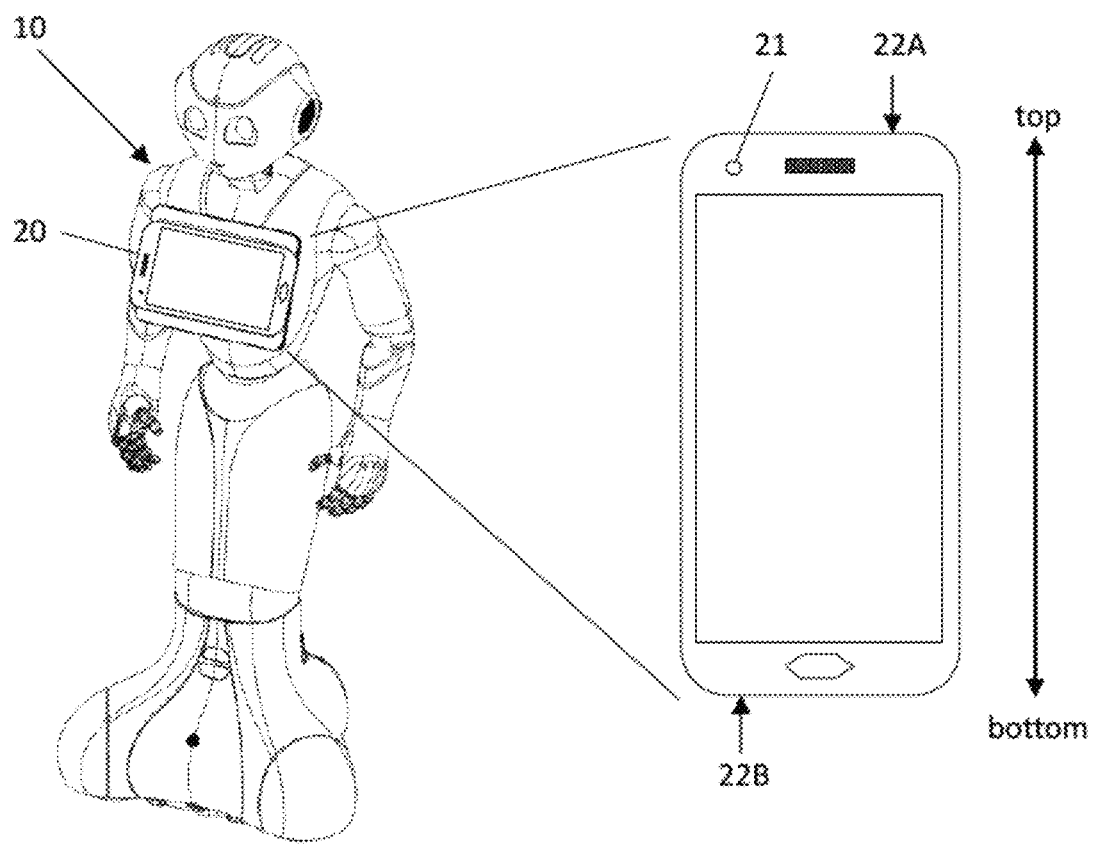
FIG. 1 illustrates a robot control unit.

FIG. 1 shows one illustrating example of a robot control unit (RCU) device. As illustrated in FIG. 1, it is substantially a mobile phone robot control unit 20 that can be used as an RCU device if it is mounted onto a robot 10, or alternatively can be used as a regular mobile phone if otherwise.

Specifically, when the mobile phone robot control unit 20 is not mounted onto the robot, it is in a mobile phone mode and is thereby used only as a regular cell phone allowing a user to make/receive calls and/or messages. Alternatively, when the mobile phone robot control unit 20 is mounted onto the robot, such as being plugged onto a vest of a humanoid robot 10 illustrated in FIG. 1, the RCU mode is turned on, allowing a human-in-the-loop robot operator to operate the robot through an app/console that is communicatively coupled with the mobile phone robot control unit 20.

The mobile phone robot control unit 20 as illustrated in FIG. 1 is typically equipped with an internal front-facing camera 21 and two built-in internal microphones 22A and 22B (commonly embedded in the rim of the device, and arranged in a top rim and in a bottom rim respectively), which allow the human-in-the-loop robot operator to respectively see and hear people standing in front of the mobile phone robot control unit and interacting with the robot. However, the following visual and audio limitations are observed.

On the one hand, only speakers (i.e. users speaking with the robot) standing completely in the focus of the front-facing camera of the device can be clearly seen by the human-in-the-loop robot operator, whereas speakers interacting with the robot that are standing outside the immediate focus of the front-facing camera cannot be clearly seen such that they can be identified or that their facial expressions can be observed at a sufficient accuracy.

Additionally, even when speakers stand in full focus of the front-facing camera, if they stand too close to the robot, the degree to which the plugged-in phone is tilted (e.g. the tilting angle is too steep) does not allow the human-in-the-loop robot operator to clearly see their faces to thereby be able to capture their facial expressions.

On the other hand, only speakers standing directly in front of the device are audible or are easy to understand, whereas speakers standing to the side of the robot (i.e. to the side of the mobile phone robot control unit device and thus to the side of the internal microphones) cannot be understood clearly or are hardly audible (i.e. the sound volume is greatly diminished). Their speech is hard or impossible to detect by the human-in-the-loop robot operator, which makes it hard to produce a fluent dialog between robot and human.

Another limiting factor is the way the device is plugged onto the torso of the robot (e.g. the vest of the robot). The openings provided with the mobile phone robot control unit for the two internal (i.e. rim-embedded) microphones only allow sound reception from the front, and thus mic exposure/reception is partially obstructed to the side and back.

To mitigate these above audio and visual limitations, currently a handler (i.e. human agent) is sometimes employed for mounting the mobile phone robot control unit onto the robot and for reminding a speaker to position themselves at a relative good angle and position facing the mounted device. The handler is typically in front of the robot, serving as a mediator or moderator, repeating questions of the robot, or guiding people (visitors/speakers) to position themselves at the best spot in front of the robot so the operator can hear and see them.

With the help of the handler, the speaker can stand in a proper proximity/angle to the robot (e.g. standing in the front of, and at a center view of the robot) in order for the human-in-the-loop robot operator to properly see and hear the speaker. As such, sounds and images of the speaker can be received by the human-in-the-loop robot operator, or in other words, the human-in-the-loop robot operator can hear and see the speakers standing in front of the robot through the RCU device.

However, in situations where there is no handler at the site, or when there is spontaneous interaction by humans with the robot, humans are unaware that the robot "sees" and "hears" them through the mobile phone robot control unit device mounted on the front of the robot's torso. As a result, they often interact with the form factors (e.g. eyes, turning head) of the humanoid robot and stand outside of the focus of the mounted device, and consequently are out of the audio- or visual reception of the human-in-the-loop robot operator.

It should be noted that the audio and visual limitations as described above are not limited to the mobile phone robot control unit as illustrated in FIG. 1. These limitations are also found in other type of robot control unit devices, where there is a general lack of coordination between, as well as a general lack of adaption of, the cameras and the microphones equipped on the robot control unit device. These limitations can also result in sub-ideal and sometimes even ineffective human-robot interactions.

In order to effectively address the above observed audio and visual limitations associated with the robot control units such as the one illustrated in FIG. 1, the present disclosure provides the following technical solutions.

In the following, with reference to the above mentioned drawings of various embodiments disclosed herein, the technical solutions of the various embodiments of the disclosure will be described in a clear and fully understandable way. It is noted that the described embodiments are merely a portion, but not all, of the embodiments of the disclosure. Based on the described embodiments of the disclosure, those ordinarily skilled in the art can obtain other embodiment(s), which shall come within the scope sought for protection by the disclosure.

In a first aspect, the present disclosure provides an audio-visual system, which is configured to work with a robot control unit to thereby provide a means for receiving/capturing sounds and images of humans interacting with a robot having the robot control unit mounted onto.

Figure 2A:
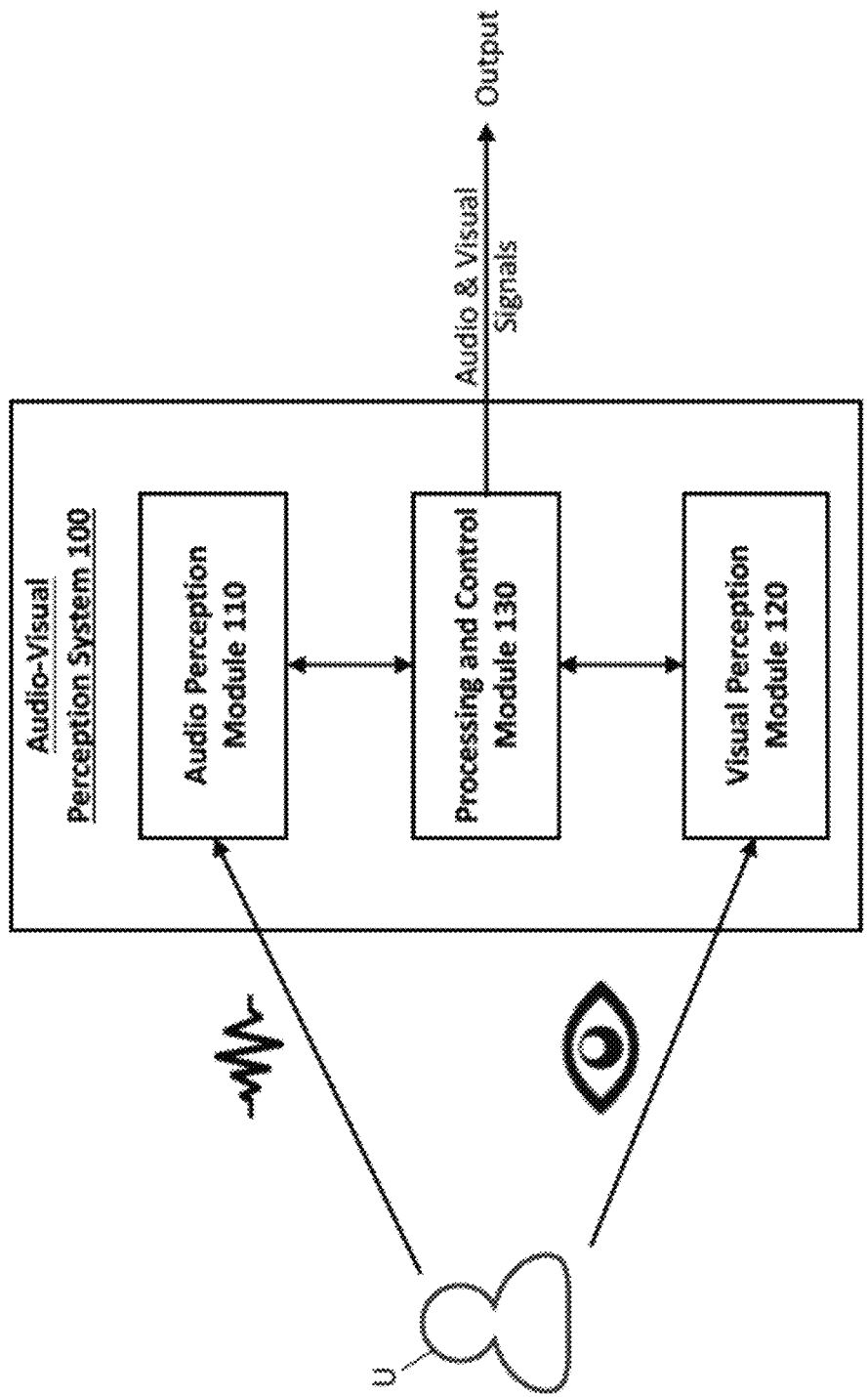
FIG. 2A shows a block diagram of an audio-visual perception system according to some embodiments of the disclosure.

FIG. 2A illustrates a block diagram of an audio-visual perception system according to some embodiments of the disclosure. As shown in FIG. 2A, the audio-visual perception system 100 comprises an audio perception module 110, a visual perception module 120, and a processing and control module 130.

The visual perception module 120 is configured to capture images of a speaker U standing in a surrounding of a device incorporating the audio-visual perception system 100, such as the robot control unit 20 mounted onto the robot 10 as illustrated in FIG. 1, to convert the images into visual signals, and then to send the visual signals to the processing and control module 130 for processing and output. The audio perception module 110 is configured to receive sounds from the speaker U, to convert the sounds into audio signals, and then to send the audio signals to the processing and control module 130 for processing and output. It is further configured such that at least one of the audio perception module 110 and the visual perception module 120 has more than one working mode.

The processing and control module 130 is communicatively coupled to each of the audio perception module 110 and the visual perception module 120, and is configured to process and output the audio signals and the visual signals received respectively from the audio perception module 110 and the visual perception module 120. The processing and control module 130 is further configured to control the one module having more than one working mode to switch a working mode thereof based on a sensory signal (i.e. the audio signal or the visual signal) received from the other module.

Figure 2B:
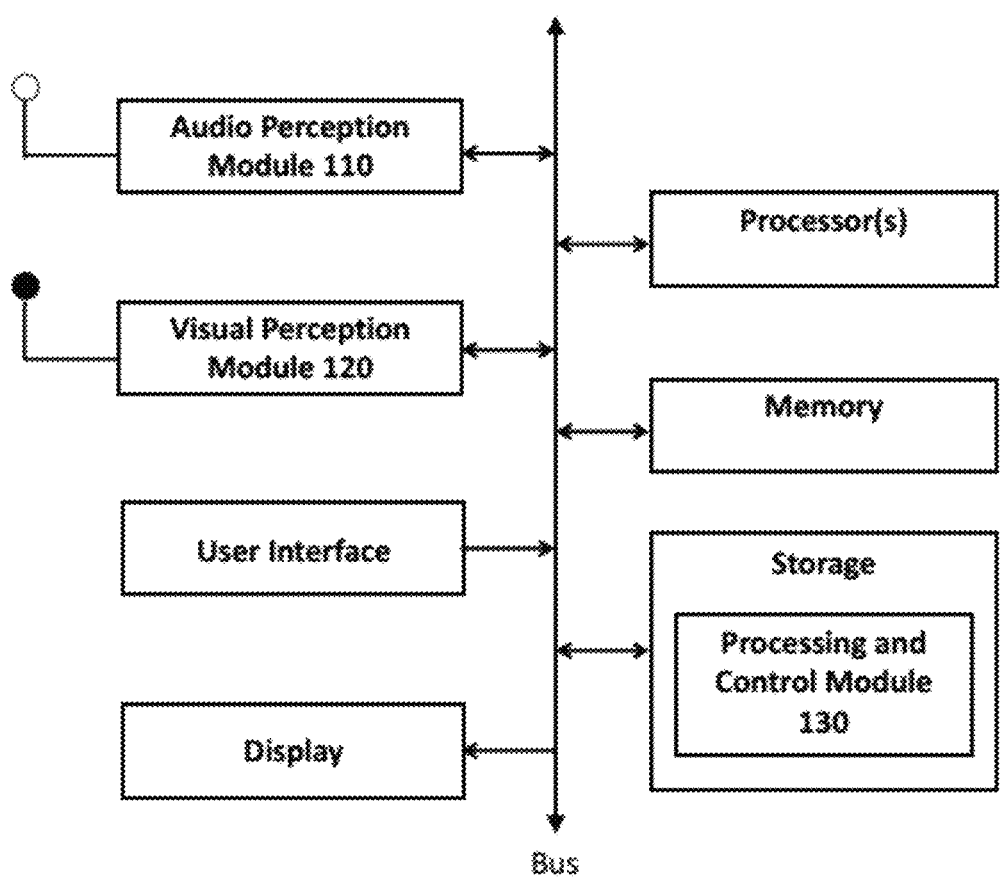
FIG. 2B shows a system architecture of the audio-visual perception system illustrated in FIG. 2A.

As further shown in FIG. 2B, which illustrates a system architecture of the audio-visual perception system shown in FIG. 2A, the audio-visual perception system can be substantially implemented in a computer system. Each of the audio perception module 110, the visual perception module 120, and the processing and control module 130 is communicatively connected to a system bus (shown as "Bus"). The computer-implemented audio-visual perception system further comprises a user interface for allowing a user to input into or output from the computer system, a display panel (shown as "Display"), one or more processors (shown as "Processor(s)"), a memory, and a storage, which are also communicatively connected to the system bus, respectively.

Each of the audio perception module 110 and the visual perception module 12 may comprise a hardware which may include a microphone (shown as an empty circle connected to the audio perception module 110), or may include a camera (shown as a filled circle connected to the visual perception module 110. Each of the above two modules may optionally comprise a software program.

The processing and control module 130 may comprise a software program. Herein the software program in the processing and control module 13, and optionally in the audio perception module 110 or the visual perception module 120 can comprise computer codes or executable instructions stored in the storage, which can be loaded into the memory allowing the one or more processors to perform calculations to thereby realize the expected functionalities of the corresponding module.

Herein it is noted that that the term "switch" or "switching", or alike, unless indicated otherwise, is equivalent to "activate", "trigger", "turn on", or alike, and thus can be referred to as, unless indicated otherwise, merely turning on a second working mode with or without the first working mode (i.e. the original working mode) being on.

Specifically, three different embodiments and their respective working processes, as illustrated in FIG. 3A and FIG. 3B, FIG. 4A and FIG. 4B, and FIG. 5A and FIG. 5B respectively, are described in detail in the following for a better illustration of the working process of the audio-visual perception system 100.

Figure 3A:
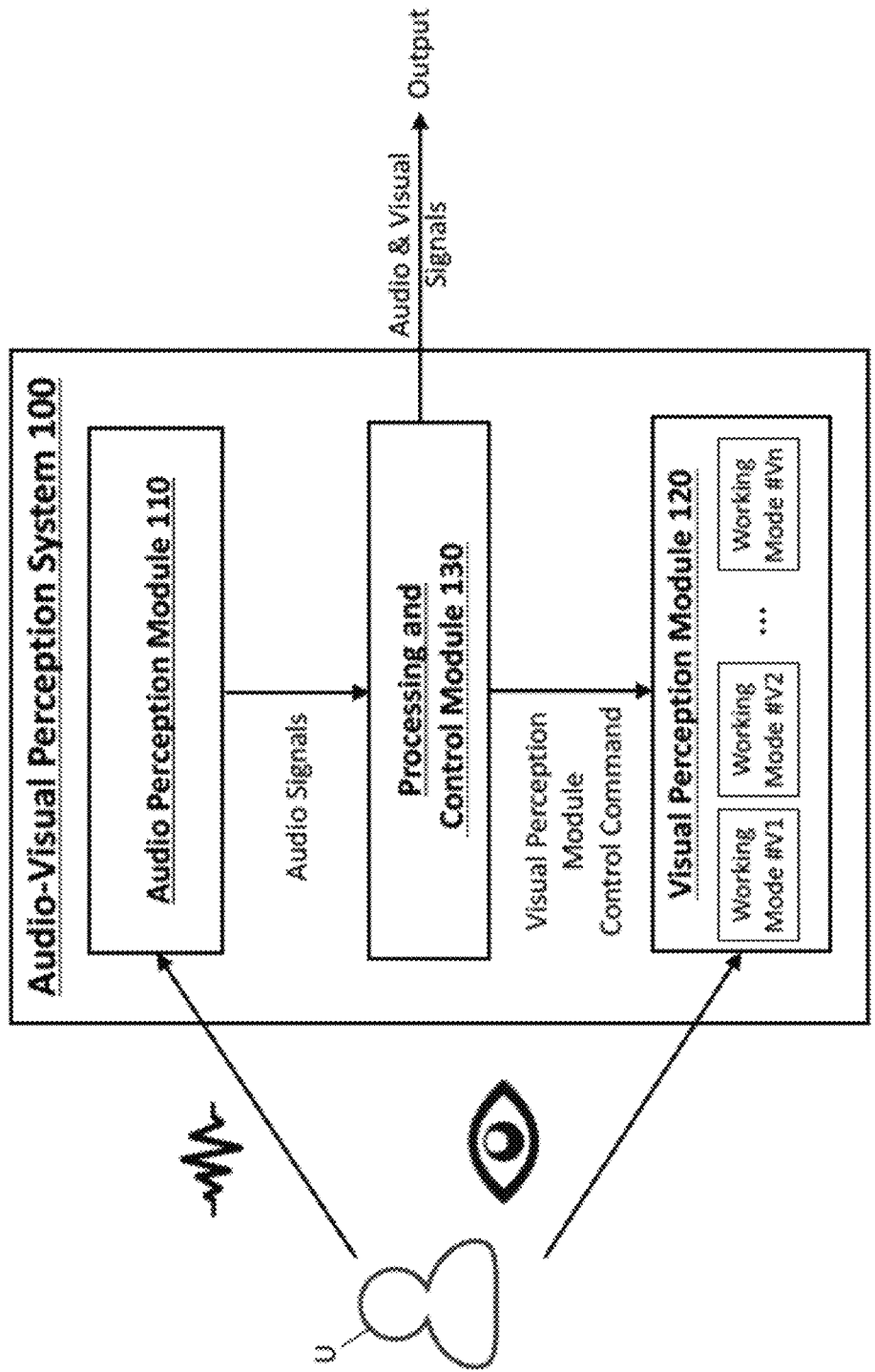
FIG. 3A illustrates a first embodiment of the audio-visual perception system shown in FIG. 2.
Figure 3B:
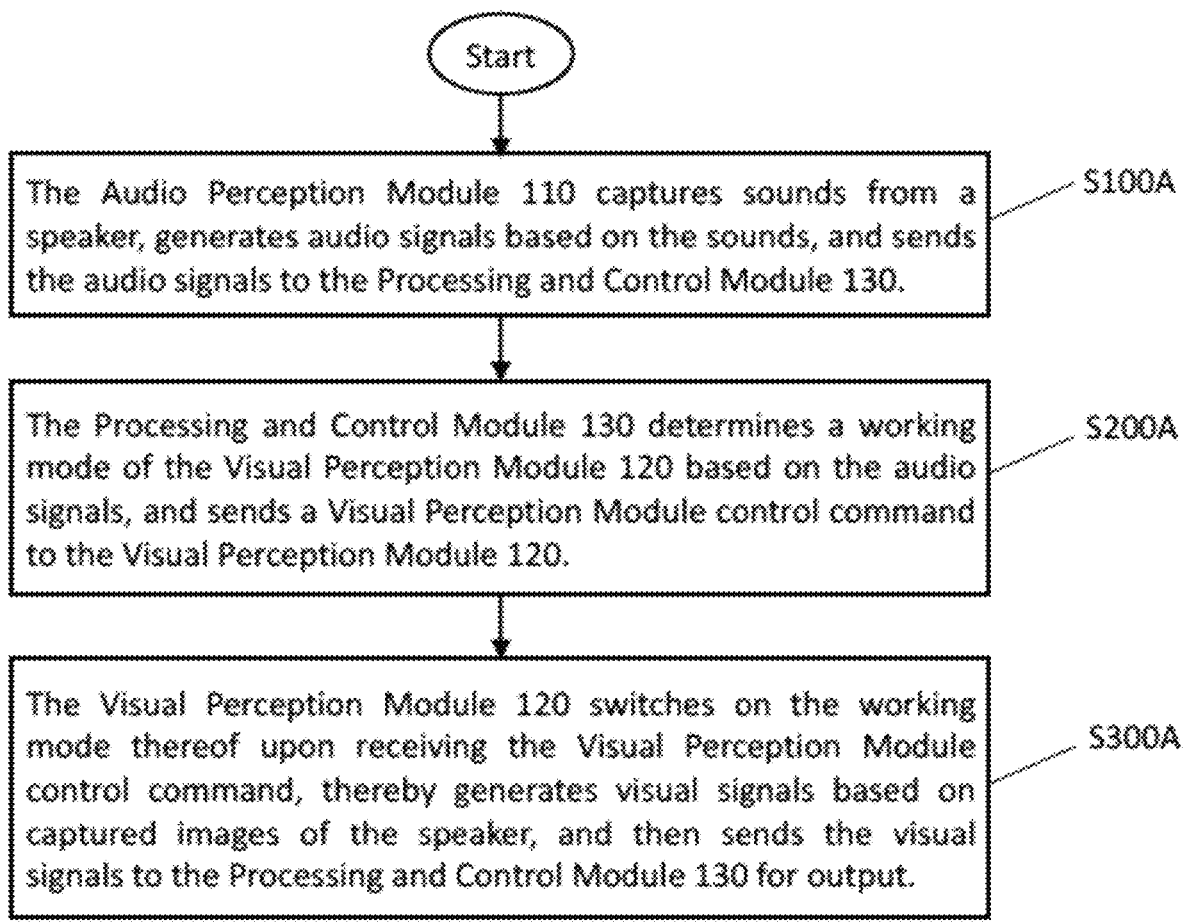
FIG. 3B is a flow chart of a working process of the first embodiment of the audio-visual perception system shown in FIG. 3A.

In a first embodiment of the audio-visual perception system 100 illustrated in FIG. 3A and FIG. 3B, only the visual perception module 120 has more than one working mode (i.e. "Working Mode #V1", "Working Mode #V2", . . . and "Working Mode #Vn" as illustrated in FIG. 3A, where n is an integer≥2).

As illustrated in the block diagram shown in FIG. 3A and in the working process (i.e. S100A, S200A and S300A) shown in FIG. 3B, the processing and control module 130 in this first embodiment of the audio-visual perception system 100 is substantially configured, upon receiving the audio signals from the audio perception module 110, to determine one of the more than one working mode of the visual perception module 120 based on the audio signals, and then to send a visual perception module control command to the visual perception module 120 to thereby switch on the one of the at least one working mode for generating the visual signals based on the captured images of the speaker U. As such, an optimized visual perception performance of the audio-visual perception system 100 can be realized.

Figure 4A:
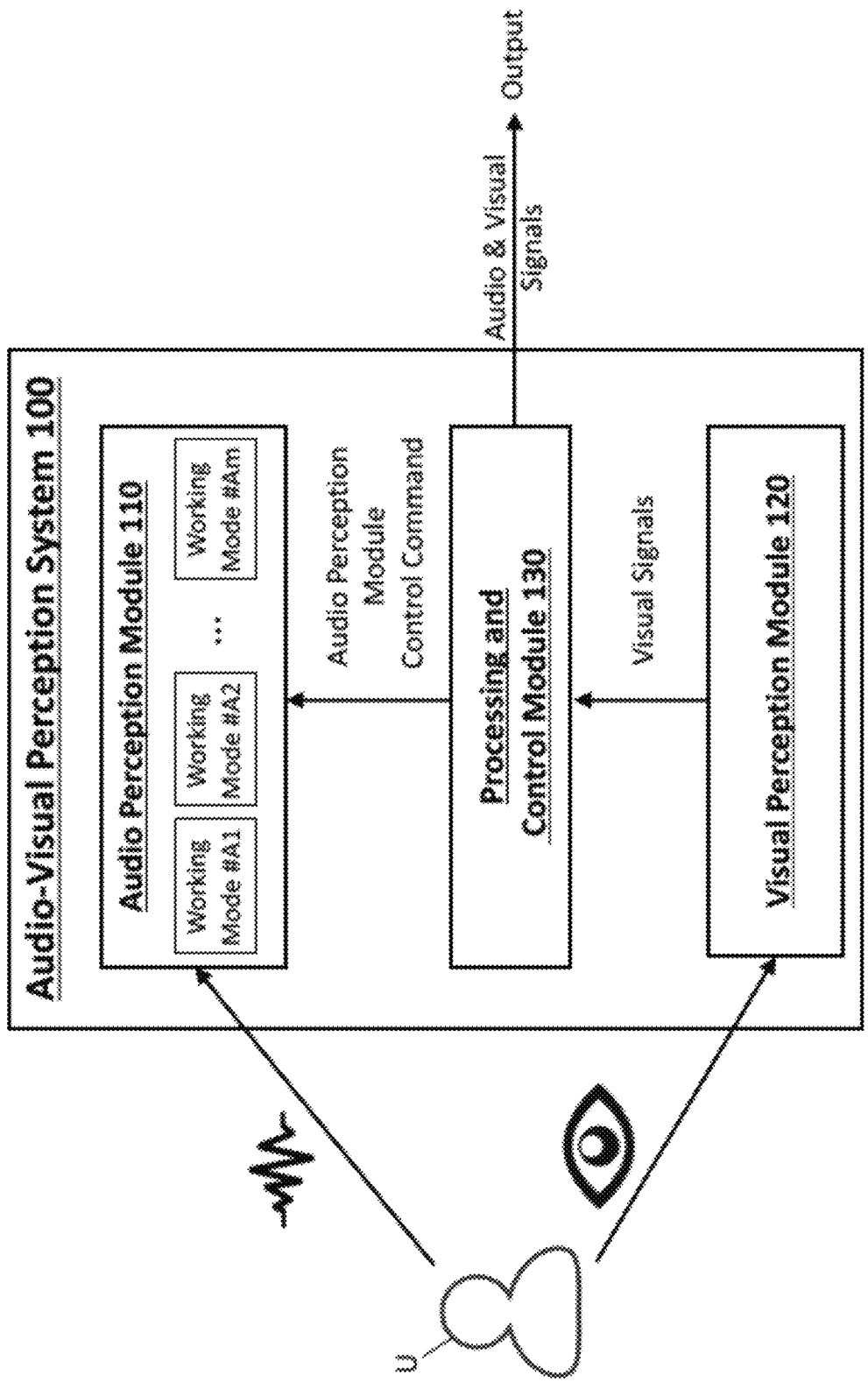
FIG. 4A illustrates a second embodiment of the audio-visual perception system shown in FIG. 2.
Figure 4B:
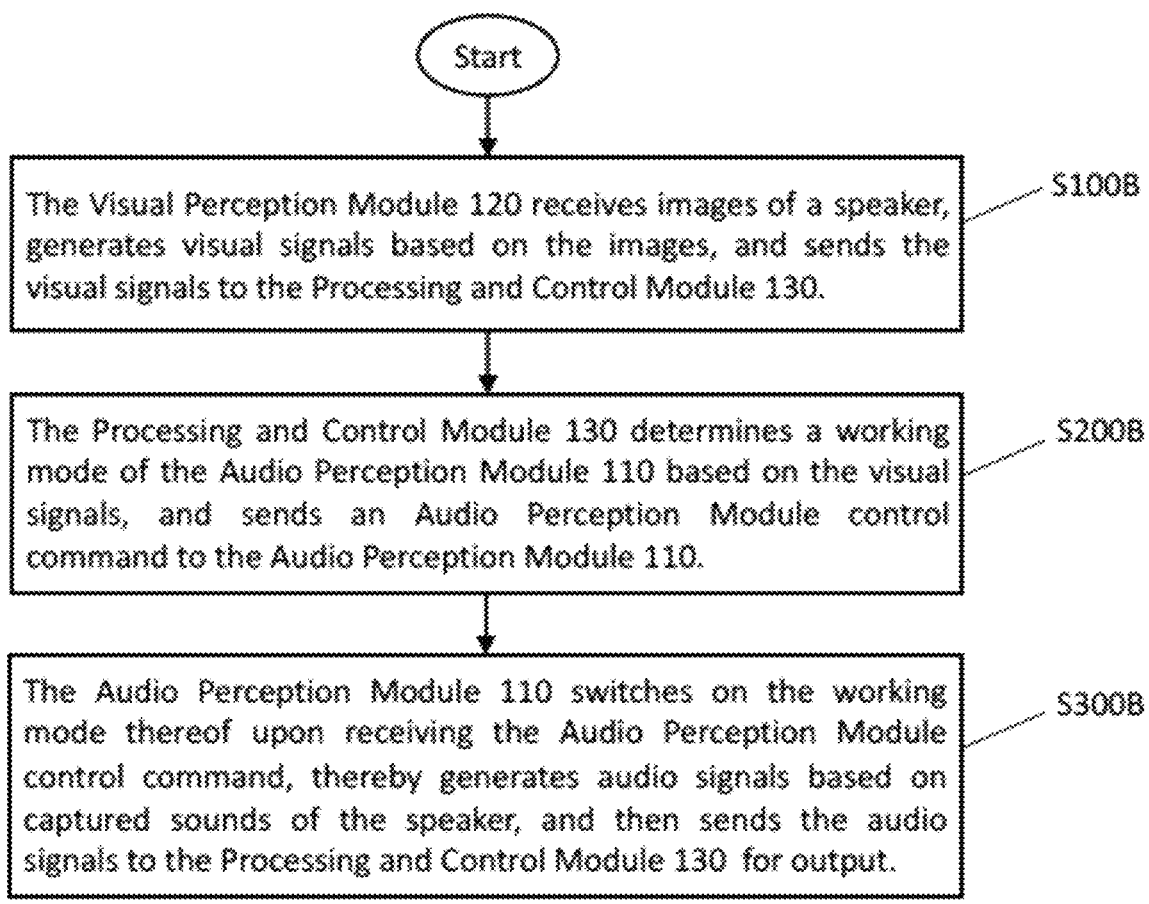
FIG. 4B is a flow chart of a working process of the second embodiment of the audio-visual perception system shown in FIG. 4A.

In a second embodiment of the audio-visual perception system 100 illustrated in FIG. 4A and FIG. 4B, only the audio perception module 110 has more than one working mode (i.e. "Working Mode #A1", "Working Mode #A2", . . . and "Working Mode #Am" as illustrated in FIG. 3B, where m is an integer≥2).

As illustrated in the block diagram shown in FIG. 4A and in the working process (i.e. S100B, S200B and S300B) shown in FIG. 4B, the processing and control module 130 in this second embodiment of the audio-visual perception system 100 is substantially configured, upon receiving visual signals from the visual perception module 120, to determine one of the more than one working mode of the audio perception module 110 based on the visual signals, and then to send an audio perception module control command to the audio perception module 110 to thereby switch on the one of the more than one working mode for generating the audio signals based on the captured sounds of the speaker U. As such, an optimized audio perception performance of the audio-visual perception system 100 can be realized.

Figure 5A:
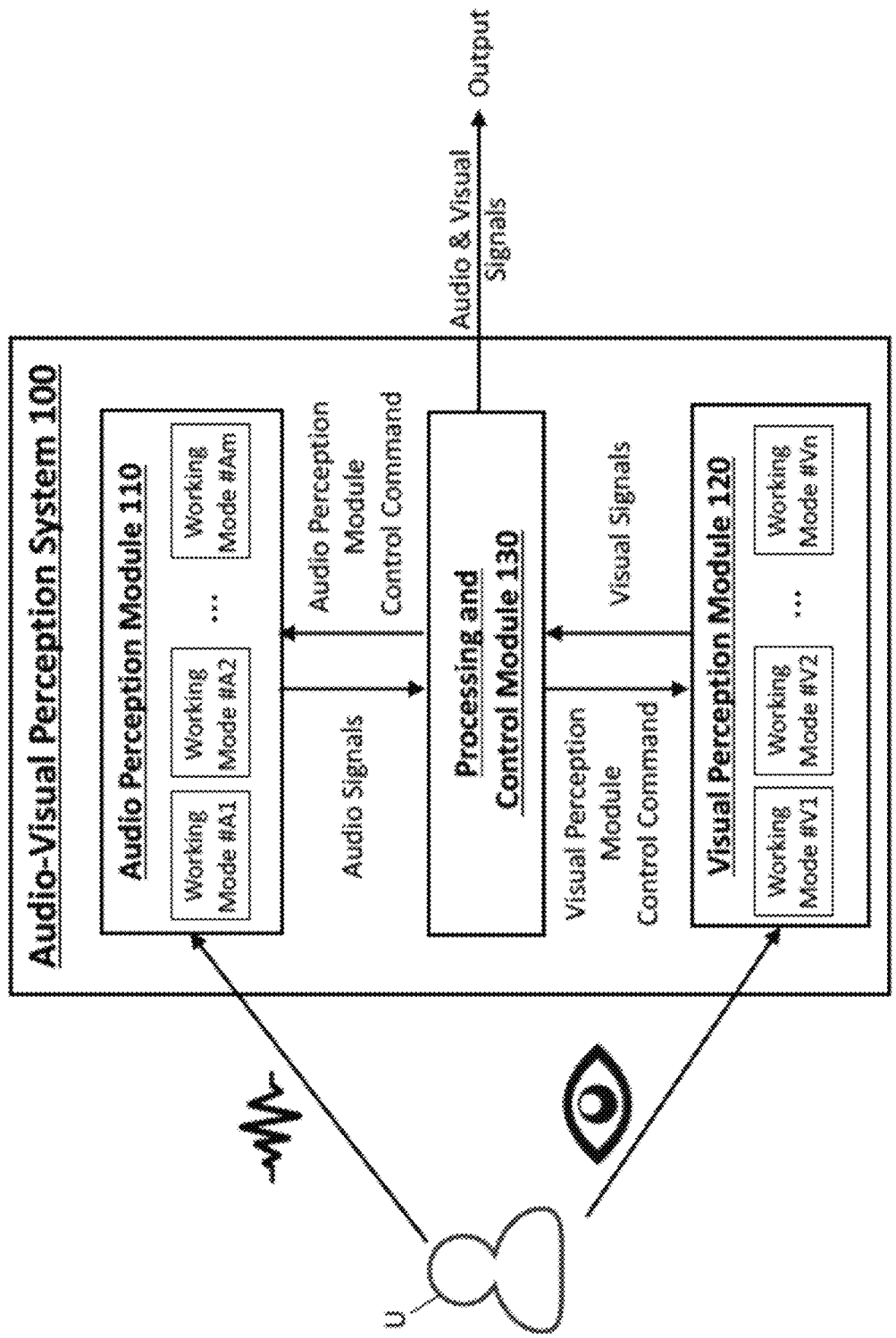
FIG. 5A illustrates a third embodiment of the audio-visual perception system shown in FIG. 2.
Figure 5B:
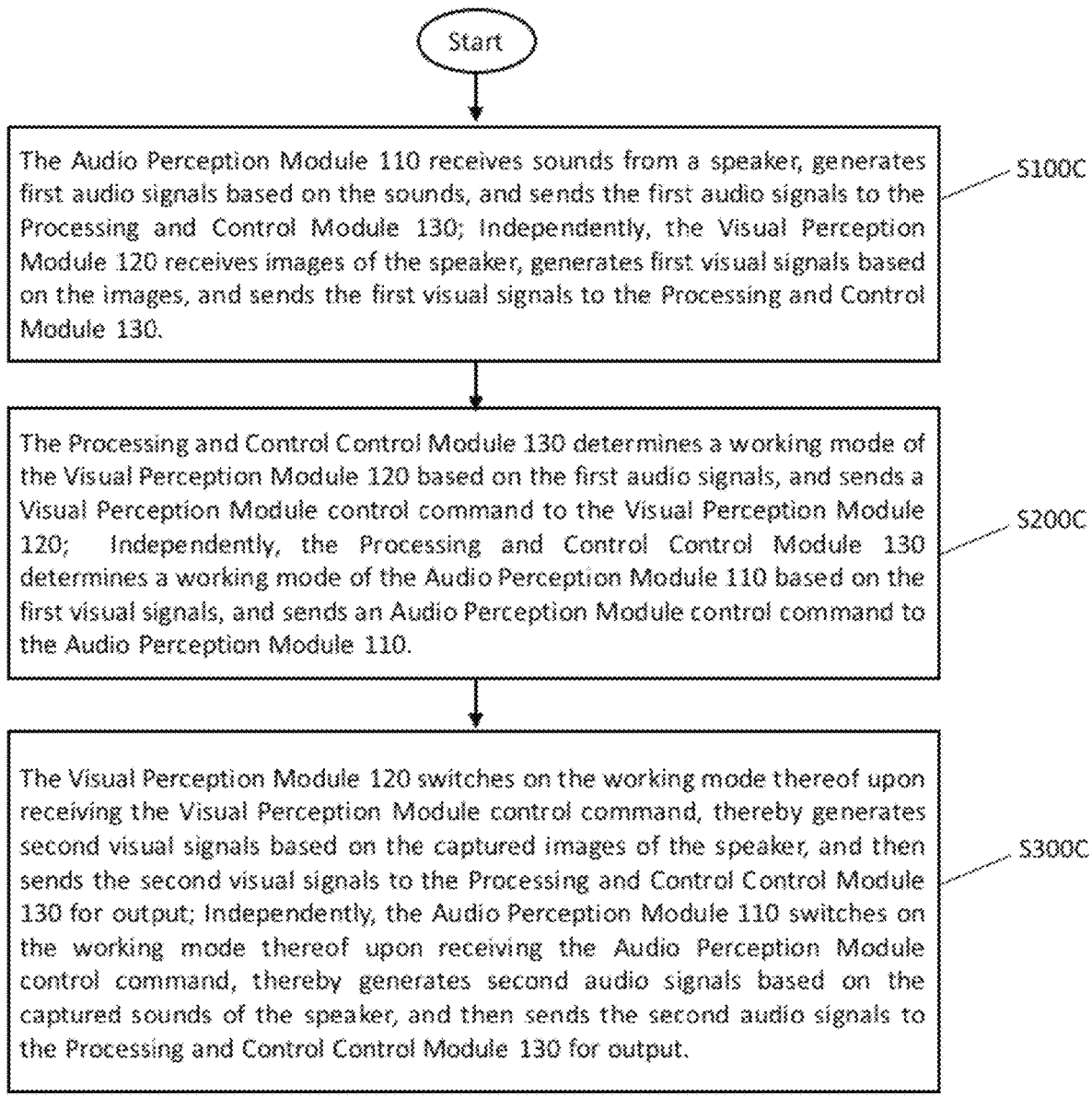
FIG. 5B is a flow chart of a working process of the third embodiment of the audio-visual perception system shown in FIG. 5A.

In a third embodiment of the audio-visual perception system 100 illustrated in FIG. 5A and FIG. 5B, each of the audio perception module 110 and the visual perception module 120 can have more than one working mode (i.e. "Working Mode #A1", "Working Mode #A2", . . . and "Working Mode #Am" for the audio perception module 110, and "Working Mode #V1", "Working Mode #V2", . . . and "Working Mode #Vn" for the visual perception module 120, where each of m and n is an integer≥2).

As illustrated in the block diagram shown in FIG. 5A and in the working process (i.e. S100C, S200C and S300C) shown in FIG. 5B, the processing and control module 130 in this third embodiment of the audio-visual perception system 100 is substantially configured to be able to operate independently in each of both ways as illustrated in the first embodiment and in the second embodiment.

More specifically, the processing and control module 130 is configured to receive first audio signals from the audio perception module 110, to determine one working mode of the visual perception module 120 based on the first audio signals, and then to send a visual perception module control command to the visual perception module 120 to thereby switch on the one working mode for generating second visual signals based on the captured images of the speaker U.

In an independent manner, the processing and control module 130 is also configured to receive first visual signals from the visual perception module 120, to determine one Working Mode of the audio perception module 110 based on the first visual signals, and then to send an audio perception module control command to the audio perception module 110 to thereby switch on the one of the more than one working mode for generating second audio signals based on the captured sounds of the speaker U.

Subsequently, the processing and control module 130 is further configured to output the second audio signals and the second visual signals, to thereby realize an optimized audio and visual perception performances of the audio-visual perception system 100.

It is noted that in any of the embodiments described above, the manner by which the processing and control module 130 determines the working mode of the visual perception module 120 based on the audio signals or the first audio signals (such as in the first and the third embodiments described above) can be based on a first pre-determined rule, and the manner by which the processing and control module 130 determines the Working Mode of the audio perception module 110 based on the visual signals or the first visual signals (such as in the second and the third embodiments described above) can be based on a second pre-determined rule.

Each of the first pre-determined rule and the second pre-determined rule can comprise a correspondence relationship between original or processed sensory signals of one type (i.e. audio signals or visual signals) and working modes of the sensory perception module of another type (i.e.

the visual perception module 120 or the audio perception module 110) that is pre-determined/pre-set and pre-stored in a medium (e.g. as a correspondence table or a script obtained in advance and stored in a memory or a storage device), allowing the processing and control module 130 to make determinations based thereon.

It is also noted that the sensory signals can be processed by the processing and control module 130 or a separate functional module, and such processed data can be utilized by the processing and control module 130 to make determinations. For example, based on the audio signals received from the audio perception module 110, the processing and control module 130 can infer information regarding relative angle, position, distance, etc. of the speaker through audio data processing, or alternatively can capture a meaning of the speaker uttering a hot word (such as "far field", "near field", etc.) through voice recognition and natural language processing. Similarly, based on the visual signals received from the visual perception module 120, the processing and control module 130 can also infer information regarding the relative angle, position, distance, etc., of the speaker U through visual data processing, or alternatively can capture a meaning of the speaker making certain gestures through image recognition.

As such, the correspondence relationship between the processed sensory signals of one type and working modes of the sensory perception module of another type can be substantially the correspondence relationship between the information inferred from the sensory signals and the working modes of the sensory perception module of another type. Specific examples will be provided in below for detailed description.

In the audio-visual perception system 100 disclosed herein, the different configurations of, and the different working modes for, each of the audio perception module 110 and the visual perception module 120 will be described in detail in the following section. It is noted that the descriptions are provided primarily using illustrating examples where the audio perception module 110 and/or the visual perception module 120 of the audio-visual perception system 100 are partially or completely incorporated in a mobile phone RCU apparatus. However, it should also be noted that these examples serve illustrating purposes only, and do not impose limitations to the scope of the disclosure, and the audio-visual perception system 100 can be in an apparatus other than the mobile phone RCU apparatus, such as a non-mobile phone RCU apparatus.

In the audio-visual perception system 100, the audio perception module 110 can optionally comprise one or more than one audio device, and can optionally be further configured to work in different working modes, depending on different practical needs and according to different embodiments of the disclosure.

According to some embodiments of the audio-visual perception system 100, the audio perception module 110 comprises only one audio device which can, for example, be configured as a built-in device on an RCU apparatus mounted onto a robot allowing a human-in-the-loop operator to hear the speaker standing around the robot. The audio device can comprise an array of microphones (i.e. microphone array) having a plurality of microphones, which are positionally arranged in tandem and functionally configured to work cooperatively to receive the sounds from the speaker U and to generate audio signals based on the received sounds.

Figure 6A:
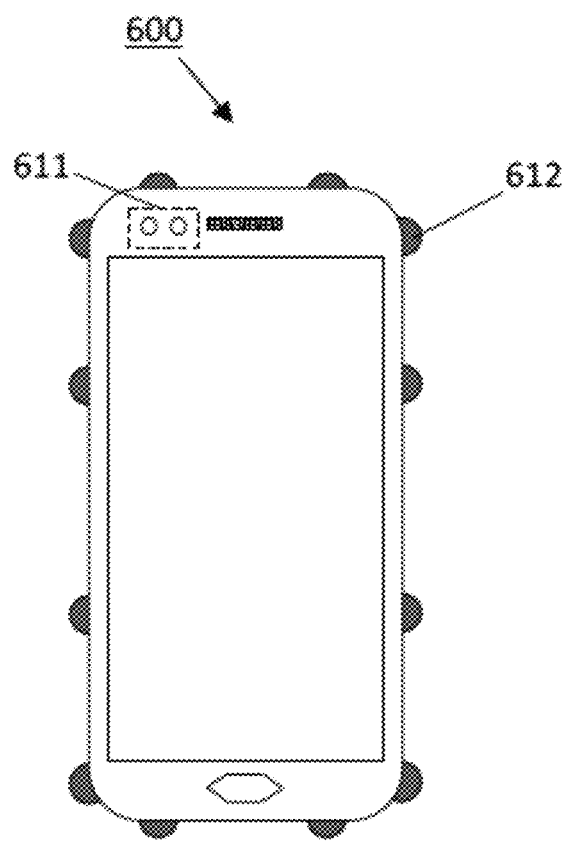
FIG. 6A is a top view of a mobile phone robot control unit apparatus incorporating an audio-visual perception system according to certain specific embodiments of the disclosure.

In one specific embodiment as illustrated in FIG. 6A, where the audio-visual perception system is configured at least partially in a mobile phone RCU apparatus 600 that can be mounted onto a robot. As shown in FIG. 6A, the audio perception module of the audio-visual perception system substantially comprises one or more front cameras 611, and an array of microphones (i.e. mic array) including a plurality of microphones 612, which are positionally arranged in tandem on top of a rim of the mobile phone RCU apparatus 600.

Figure 6B:
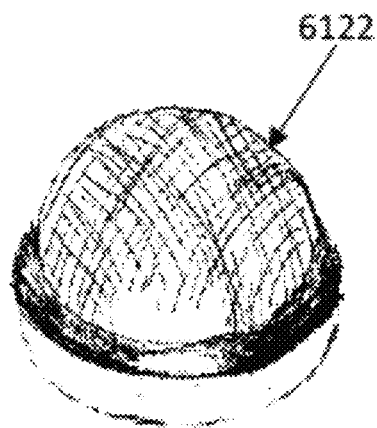
FIG. 6B shows a perspective view of a schematic diagram of a microphone in the microphone array of the mobile phone robot control unit apparatus shown in FIG. 6A according to some embodiments of the disclosure.
Figure 6C:
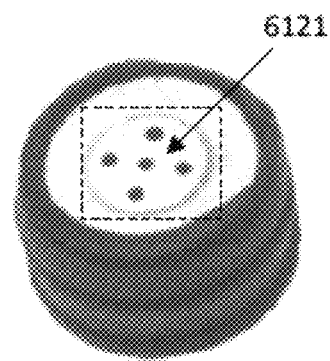
FIG. 6C shows an inside of the microphone illustrated in FIG. 6B without the covering cage/membrane.

As further illustrated in FIG. 6A, each of the plurality of microphones 612 in the mic array is preferably an outward-/sideway-facing omnidirectional microphone. As such incoming sound can be detected from a source (such as a speaker) located to the side of the mobile phone RCU apparatus 600 once the mobile phone RCU apparatus 600 is plugged in or mounted onto a robot. As further shown in FIG. 6B and FIG. 6C, each microphone 612 can optionally comprise a functional piece 6121 and is further provided with a half-dome shaped miniature cage 6121, a membrane, or a like, which is configured to protect the functional piece 6121 of the microphone 612 that is covered thereby. Other configurations are also possible.

Such an arrangement and configuration for the mic array in the audio perception module has the following advantages: positioning a mic array on top of the rim of the mobile phone RCU apparatus 600 provides more exposure to incoming sounds than existing embedded microphones that sit in/under the rim, where the sound waves have to travel through a pinhole-size aperture in order to hit the microphone itself. Being outside of the rim, the microphones would be able to pick up a lot more sound from different directions and detect speech of the speaker standing from the side of the mobile phone RCU apparatus 600.

According to some other embodiments of the audio-visual perception system 100, the audio perception module 110 comprises more than one audio device, each individually configured to be able to receive, and then to convert into the audio signals, the sounds from the speaker U.

Figure 7:
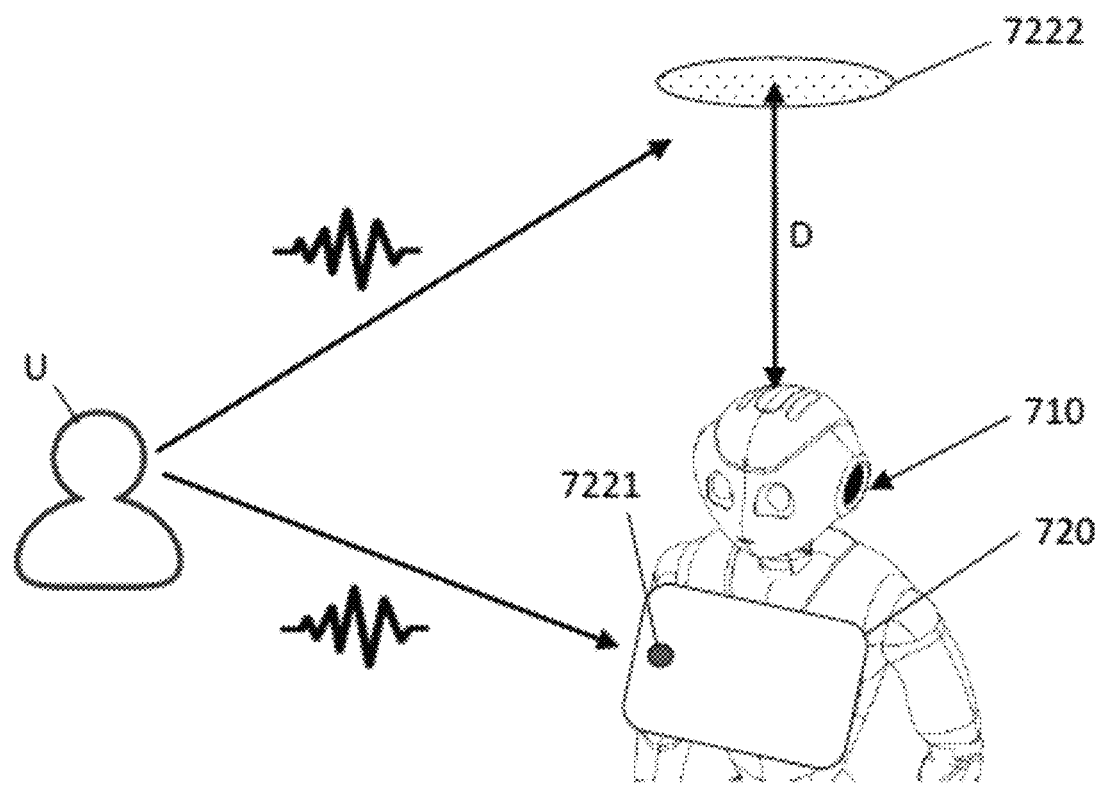
FIG. 7 illustrates an audio perception module of an audio-visual perception system according to some embodiments of the disclosure.

In one specific illustrating example shown in FIG. 7, the audio perception module consists of two audio devices 7221 and 7222, both configured to be able to receive the sounds from the speaker U. Among the two audio devices of this specific embodiment of audio perception module (i.e. a first audio device 7221 and a second audio device 7222) illustrated in FIG. 7, the first audio device 7221 is substantially a built-in audio device in a mobile phone RCU apparatus 720 mounted onto a robot 710 that can be activated to receive the sounds from a speaker U standing within a pre-determined range (i.e. within a certain distance, e.g. ~2 meters, to the robot control unit) and then to convert the sounds into the audio signals. The second audio device 7222 is substantially a physically separated audio device having a distance D to the robot 710 that features an ultra-sensitive capability and can be activated when the speaker U stands outside the pre-determined range.

Specifically, if the speaker U stands within the pre-determined range (e.g. at a distance of ~1.0 meter to the RCU apparatus 720 mounted onto the robot 710), the audio perception module can be configured to work in a first working mode wherein the first audio device 7221 (i.e. the internally built-in audio device) can be activated to receive, and then to convert into the audio signals, the sounds of the speaker U, whereas the second audio device 7222 is deactivated or suppressed, to thereby save energy and other resources.

However, if the speaker U stands outside the pre-determined range (e.g. at a distance of ~2.0 meters to the robot control unit 720 mounted onto the robot 710), the audio perception module 110 can be configured to work in a second working mode wherein the first audio device 7221 is deactivated or suppressed, and the second audio device 7222 having an ultra-sensitive capability is activated to thereby receive the sounds of the speaker U and then to convert the sounds into the audio signals.

Herein the pre-determined range can be the maximum distance at which the first audio device 7221 can detect, at a sufficiently accurate level, the sounds from the speaker U speaking at a regular voice volume. The second audio device 7222 can comprise a specially designed microphone array that can, for example, take a disc-like shape and can be hung overhead of the robot 710 having a distance D to the robot as illustrated in FIG. 7. The microphone array in the second audio device 7222 can be arranged in tandem and configured to work cooperatively to receive the sounds of the speaker U.

In addition to the regular mode vs ultra-sensitive mode (i.e. the near-field mode vs the far-field mode) as described above in the illustrating example shown in FIG. 7, the different working modes for the audio perception module 110 can also include other features such as beam-forming options, barge-in options, different channel frequencies, noise reduction, acoustic cancellation, and automatic speech recognition, etc. Each of these different working modes can be switched on or off depending on practical needs, and there are no limitations herein.

The different working modes of the audio perception module 110 can also include the embodiments where the audio perception module 110 include a plurality of audio devices, each arranged at a different position and/or having a different working directionality and thereby configured to have a different working region corresponding thereto. Thus, the turning-on of a different audio device can represent a different working mode of the audio perception module 110, allowing for the effective capture of the sounds of the speaker U standing at a corresponding working region.

In one example, if the audio-visual system 100 determines that the speaker U is standing within a working region corresponding to one specific audio device, the corresponding audio device is turned on, while other audio devices of the audio perception module 110 are turned off, to thereby allow the sounds of the speaker U to be captured in an optimized manner. Each different combination of these audio devices that are either turned on or off in the audio perception module 110 substantially forms a different working mode therefor.

In the audio-visual perception system 100 disclosed herein, the visual perception module 120 can comprise at least one camera, and can be further configured to work in different working modes, depending on different practical needs and according to different embodiments of the disclosure.

According to some embodiments of the disclosure, the visual perception module 120 comprises one camera configured to be able to work in different modes, which can, for example, be configured as a built-in device on an RCU apparatus mounted onto a robot allowing a human-in-the-loop operator to see the speaker standing in front of the robot.

In one illustrating example, the camera of the visual perception module 120 can be configured to be able to zoom in or out, thereby adjusting the lens focus of the camera. As such, the different working modes include different lens focuses of the camera, depending on the relative distance of the speaker U to the robot control unit which can be determined by the audio perception module 110 in the audio-visual perception system 100.

Figure 8A:
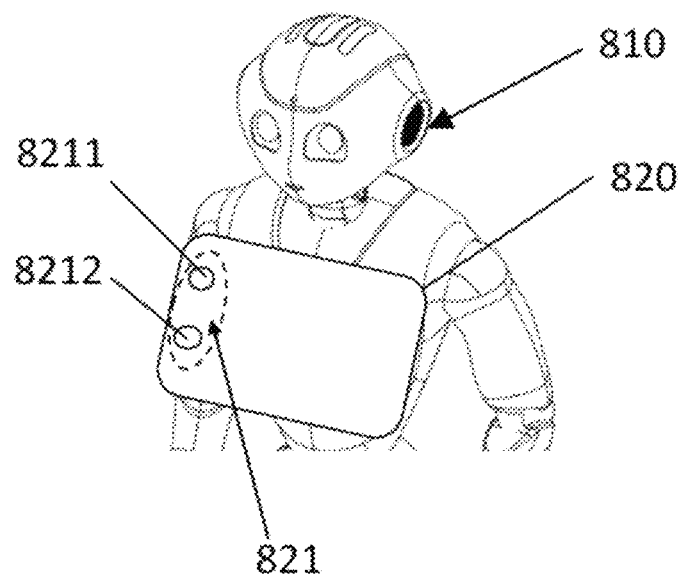
FIG. 8A illustrates a visual perception module comprising a front-facing and dual-lens cameras 821 according to some embodiments of the disclosure.

According to some other embodiments of the disclosure, the visual perception module 120 comprises at least two cameras, which are configured to respectively work in different modes. In one specific illustrating example as shown in FIG. 8A, the visual perception module comprises a dual-camera device 821 consisting of two front-facing cameras, with a first camera 8211 working as a normal-field camera and a second camera 8212 working as a wide-angle camera. Both of the first camera 8211 and the second camera 8212 are configured as built-in devices on a robot control unit 820 mounted onto a robot 810, as illustrated in FIG. 8A.

Figure 8B:
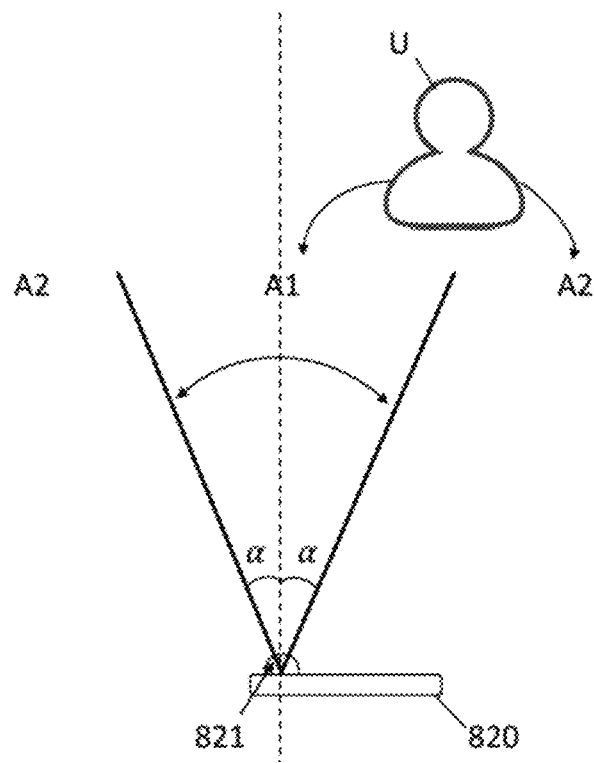
FIG. 8B illustrates a normal-angle working mode and a wide-angle working mode of the visual perception module illustrated in FIG. 8A.

With further reference to FIG. 8B, which illustrates the normal-angle working mode and the wide-angle working mode of the visual perception module illustrated in FIG. 8A, if the speaker U stands within a pre-determined range A1 (i.e. in a region having an angle smaller than or equal to a value of a to the focal line of the lens of the first camera 8211 of the dual-camera device 821 in the robot control unit 820), the visual perception module can be configured to work in a first working mode (i.e. the normal-angle working mode) wherein the first camera 8211 is activated to receive the images of the speaker U, whereas the second camera 8212 is deactivated or suppressed for saving resources.

However, if the speaker U stands outside the pre-determined range A1 (e.g. in a region A2 shown in FIG. 8B), the visual perception module can be configured to work in a second working mode (i.e. the wide-angle working mode) wherein the first camera 8211 is deactivated, and the second camera 8212 having a wide-angle capability is activated to thereby receive the images of the speaker U.

It is noted that in addition to the two cameras in the above embodiments of the visual perception module illustrated in FIG. 8A and FIG. 8B, the visual perception module can optionally include cameras of other capabilities, such as a camera with a monochrome lens, a camera capable of capturing images based on infrared light, etc. There are no limitations herein.

In addition to the above embodiments of the visual perception module where the different working modes concern focuses, angles, light monochrome, and/or light wavelengths of the lens of the camera(s), the different working modes for the visual perception module can also include other features such as bokeh-effect options, different apertures, different video capabilities (e.g. regular mode vs slow-motion mode), different definitions (e.g. regular definition vs relatively high definition), etc. Each of the different working modes can be switched on or off depending on practical needs.

It is noted that in this disclosure, there are no limitations to the number of cameras included in, and/or the manner of realizing the different working modes for, the visual perception module. For example, each of these different working modes can be specific to each different camera, or can be realized through a hardware, a software, or a combination thereof.

In one example, the different working modes with different zooms for the visual perception module can be realized by a single-lens camera having its focus adjusted through a software, or can be realized by two or more cameras, each with a different zooming range. In another example, the different working modes with or without a bokeh effect can be realized by a single-lens camera with a software capable of creating the bokeh effect, or can be realized by means of two cameras together capable of creating the bokeh effect.

Furthermore, the visual perception module can be further provided with other capabilities for the determination of features/positions/metrics of, or signals given by, the speaker U, based on which the audio perception module can switch between different working modes such that an optimized capture of the sounds of the speaker U can be realized. Examples of the features/properties/parameters/metrics of the speaker U can include a relative angle and/or a relative distance of the speaker U, and can also include a gesture made by the speaker U.

Taken together, the present disclosure provides an audio-visual perception system that can, through a crosstalk between the audio perception module and the visual perception module, adaptively receive sounds from, and images of, a subject capable of producing audio and visual cues (such as a human, an animal, or a machine, etc.) to thereby realized an optimized audio and visual capture performance.

In one illustrating example, the audio-visual perception system can be directly employed by a robot or a machine to realize an effective and efficient human-machine interaction. In another example, the audio-visual perception system can be incorporated into a robot control unit apparatus which, when integrated into, plugged in, or mounted onto a robot, can allow a human-in-the-loop robot operator to realize an optimized perception of the environment of the robot that he/she is controlling. There are no limitations herein.

In a second aspect, the disclosure further provides an audio-visual perception apparatus, which substantially comprises an audio-visual perception system according to any one of the embodiments as described and illustrated above.

Herein, the audio-visual perception apparatus disclosed herein can be employed by a robot in a robot system to thereby allow the robot to visually and audibly sense a subject in a surrounding of the robot (i.e. to receive, and then to convert into audio and visual signals, sounds and images of the subject in the surrounding of the robot) so as to allow a human-machine interaction between the subject and the robot in the robot system.

Optionally, the audio-visual perception apparatus disclosed herein can be utilized as a robot control unit (RCU) integrated into, or alternatively mounted onto, a robot in a robot system, which is configured to allow a human-in-the-loop robot operator to visually and audibly sense a subject in the surrounding of the robot.

In any of the utilities of the audio-visual perception apparatus as described above, the subject can be a human speaker, an animal or an object capable of producing audio and visual cues.

According to some embodiments, the audio-visual perception apparatus can be an integrated part of a robot in the robot system.

According to some other embodiments, the audio-visual perception apparatus can comprise only a mountable portion (i.e. without other separate portion(s)) that is plugged/mounted onto, a robot in the robot system to thereby facilitate control of the robot by a human-in-the-loop robot operator. Herein, the audio-visual perception apparatus can be mounted onto the robot via a mounting member (i.e. mounting means, such as a vest clamp, etc.) that is attached onto the robot (e.g. onto a front side of a vest of the robot).

Further optionally, the audio-visual perception apparatus may comprise a mountable portion and at least one separate portion. The mountable portion can be mounted onto the robot, whereas the at least one separate portion is arranged to be physically separated from (thus not mounted onto) the robot.

In one example, the audio-visual perception apparatus may, in addition to the mountable portion that is equipped with a first camera device and a first microphone device, further include at least one other camera device that is positionally separated from the mountable portion, and each of the at least one other camera device may be at a different position in the space having the robot, and/or have a different features regarding focus ranges, shooting angles, light monochrome capability, a capabilities of capturing light of different wavelengths, bokeh-effect capabilities, different apertures, different video capabilities, or different definitions, etc.

In another example, the audio-visual perception apparatus may, in addition to the mountable portion that is also equipped with a first camera device and a first microphone device, further include at least one other microphone device that is positionally separated from the mountable portion, and each of the at least one other microphone device may be at a different position in the space having the robot and thus having a different working region, and/or have a different features regarding different levels of sensitivity, beam-forming capabilities, barge-in capabilities, different channel frequencies, different levels of noise reduction, acoustic cancellation capabilities, or automatic speech recognition capabilities, etc.

In any of the above embodiments of the audio-visual perception apparatus, the mountable portion can be a mobile phone robot control unit (RCU) device as illustrated in FIG. 1. More specifically, with reference to FIG. 1, the audio-visual perception apparatus can be used as an RCU if and when the mountable portion thereof is mounted onto a robot 10, or alternatively can be used as a regular mobile phone (i.e. cell phone) if otherwise. As such, the mountable portion of the audio-visual perception apparatus can be regarded as a mobile phone RCU device 20.

In order to provide convenience to switching between these two different functionalities, according to some embodiments of the disclosure, the audio-visual perception apparatus can be configured to have dual modes consisting of an RCU mode and a cell phone mode, which can be switched on and off by means of a dual-mode switch.

The dual-mode switch can, according to some preferred embodiments, be configured such that when one mode is turned on, the other mode is suppressed or is turned off. For example, when in the RCU mode, the mountable portion of the audio-visual perception apparatus can be plugged into or mounted onto a robot to enable a human-in-the-loop operator to control the robot, while at the same time the dual-mode switch suppresses all functions of a regular cell phone (e.g. receiving calls and messages) to thereby ensure that the apparatus operates solely as an RCU device. On the other hand, when the apparatus is in the cell phone mode, such as when the mountable portion of the audio-visual perception apparatus is detached from the robot, the dual-mode switch turns off the robot control functionality.

Optionally, the dual-mode switch can be realized by a software/application (APP) that is run on the apparatus. According to some specific embodiments, the dual-mode switch can comprise a graphic user interface (GUI) as illustrated by "RCU Switch" in FIG. 9, which can be displayed on an interactive display panel (e.g. a touch control display panel) of the apparatus (e.g. the display panel is arranged as part of the mobile phone RCU device 20 in the whole audio-visual perception apparatus), allowing a user to pick which one of the two modes (i.e. the "RCU mode" and the "cell phone mode") can be switched on while still informing the user that the functionality of the other mode is suppressed or turned off, as further illustrated in FIG. 9.

According to some other embodiments, the dual-mode switch can comprise a voice user interface (VUI). The dual-mode switch can, for example, prompt a user to choose between the two modes of "RCU mode" and the "cell phone mode" upon mounting or demounting of the mobile phone RCU device 20 onto or off from the robot. When the user makes a choice, one of the two modes will be switched on while the other mode will be suppressed or turned off.

Optionally, the dual-mode switch can be realized by hardware, and can optionally comprise a button, a lever, a knob, or alike, that is physically built in the mountable portion of the audio-visual perception apparatus (i.e. the mobile phone RCU device 20) and can, when triggered (e.g. pressing the button, moving the lever, or turning the knob, etc.), switch between the RCU mode and the cell phone mode.

In a third aspect, the disclosure further provides a robot system, which comprises a robot and an audio-visual perception apparatus that is communicatively connected to the robot. The audio-visual perception system can be based on any one of the embodiments as described and illustrated above.

Optionally, in the robot system, the audio-visual perception apparatus is configured to allow the robot to visually and audibly sense a subject in a surrounding of the robot (i.e. to receive, and then to convert into audio and visual signals, sounds and images of the subject in the surrounding of the robot) so as to allow a human-machine interaction between the subject and the robot in the robot system.

Further optionally, in the robot system, the audio-visual perception apparatus can be configured as a robot control unit (RCU), which is integrated into, or alternatively mountable onto, the robot, thereby allowing a human-in-the-loop robot operator to visually and audibly sense a subject in the surrounding of the robot.

In embodiments of the robot system where the audio-visual perception apparatus comprises a mountable portion, the robot system can comprise a mounting member (i.e. mounting means) configured to mediate the mounting of the mountable portion (e.g. the mobile phone RCU device 20 illustrated in FIG. 1) of the audio-visual perception apparatus onto the robot. As such, in the robot system herein, the mounting member is substantially a connecting adaptor between the mountable portion of the audio-visual perception apparatus and the robot.

Preferably, with further reference to FIG. 1, the mounting member is fittingly compatible with the mountable portion (i.e. the mobile phone RCU device 20) of the audio-visual perception apparatus to thereby allow the convenient mounting and/or demounting of the mountable portion of the audio-visual perception apparatus onto and/or off from the robot. It is further configured such that the mounting member does not influence the functionality of the audio-visual perception apparatus.

Optionally, the mounting member comprises a first connecting part and a second connecting part. The first connecting part is fixedly or detachably attached onto the robot (e.g. at a docking part of the robot such as a vest or an additional part thereof). The second connecting part is attached with the first connecting part, and is configured to be able to securely hold the mountable portion of the audio-visual perception apparatus yet without influencing the functionality of the audio-visual perception system in the audio-visual perception apparatus.

Figure 10A:
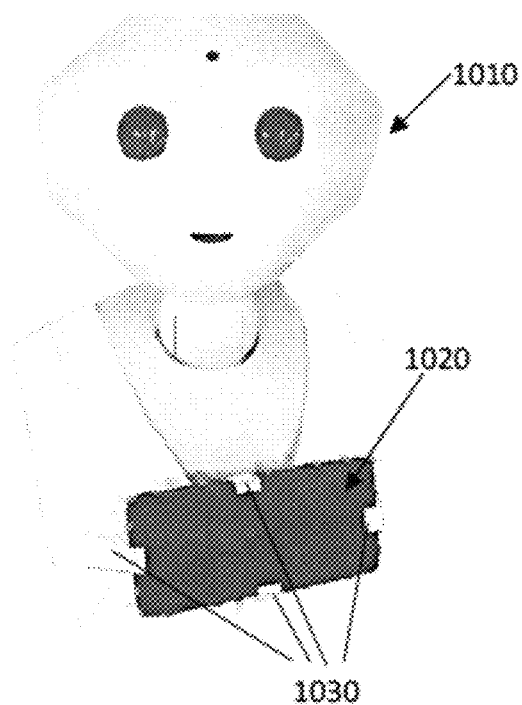
FIG. 10A illustrates a mounting means for mounting a mobile phone RCU apparatus on a robot according to some embodiments of the disclosure.
Figure 10B:
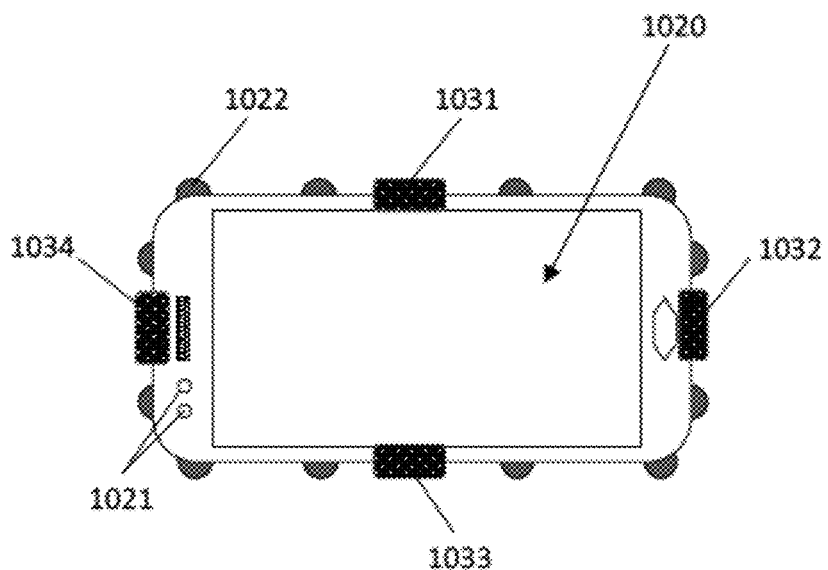
FIG. 10B is a top view of the mounting means as illustrated in FIG. 10A.

According to some embodiments of the robot system as illustrated in FIG. 10A and FIG. 10B, the second connecting part of the mounting member comprises a clamp 1030 having four clamping pieces 1031, 1032, 1033, and 1034 that can securely snap the mountable portion 1020 (i.e. a mobile phone RCU device) of the audio-visual perception apparatus on the first connecting part attached onto the robot 1010 (not shown in the figures) yet without covering any microphone 1022 in the microphone array (i.e. the audio perception module) or any lens 1021 in the camera(s) (i.e. the visual perception module) such that the microphones 1021 and the lens 1022 can be completely exposed to be realize a full functioning of the audio perception module and the visual perception module of the audio-visual perception system built in the mobile phone RCU apparatus 1020. The clamp 1030 can be manufactured by injection molding or 3D printing.

Optionally, the angle of the clamp 1030 on the second connecting part can be further configured to be adjustably tilted such that the mobile phone RCU apparatus 1020, once snapped in the clamp 1030 to thereby mount onto the robot 1010, has a relatively not so steep angle facing a speaker standing in close proximity to the robot 1010. As such, a human-in-the-loop robot operator can see the speaker with ease through the visual perception module (i.e. the camera) of the audio-visual perception system built in the mobile phone RCU apparatus 1020 that is mounted onto the robot 1010.

According to some embodiments of the robot system, the second connecting part, or the clamp on the second connecting part, of the mounting member is provided with an angle adjustment mechanism for manually adjusting the angle of the clamp. Preferably, the angle adjustment mechanism is configured to be automatic, allowing the angle of the mobile phone RCU apparatus 1020 snapped in the clamp 1030 on the robot to be able to adaptively adjusted based on the images captured by the camera(s) in the mobile phone RCU apparatus 1020.

In the following, several specific embodiments of the audio-visual perception apparatus used in a robot system described above are provided so as to offer a more detailed illustration of the structure, configuration, and the working process thereof.

Embodiment 1

Figure 11A:
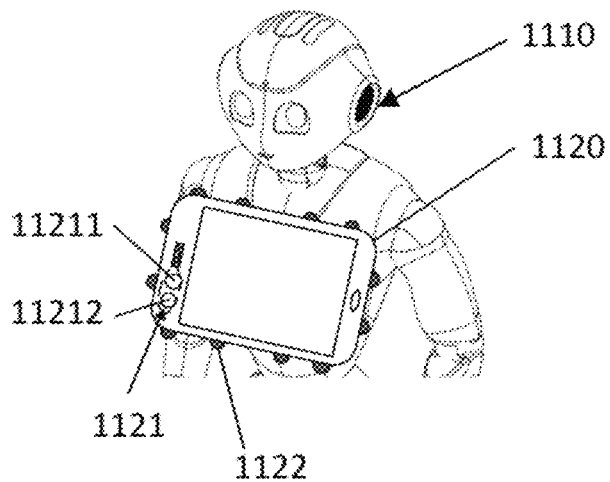
FIG. 11A illustrates a mobile phone robot control unit (RCU) apparatus incorporating an audio-visual perception system according to one specific embodiment of the disclosure.

FIG. 11A illustrates an audio-visual perception apparatus used in a robot system according to some embodiments of the disclosure. The audio-visual perception apparatus therein comprises a single mobile phone robot control unit (RCU) device 1120 which, along with the robot 1110, substantially form a robot system.

Figure 9:
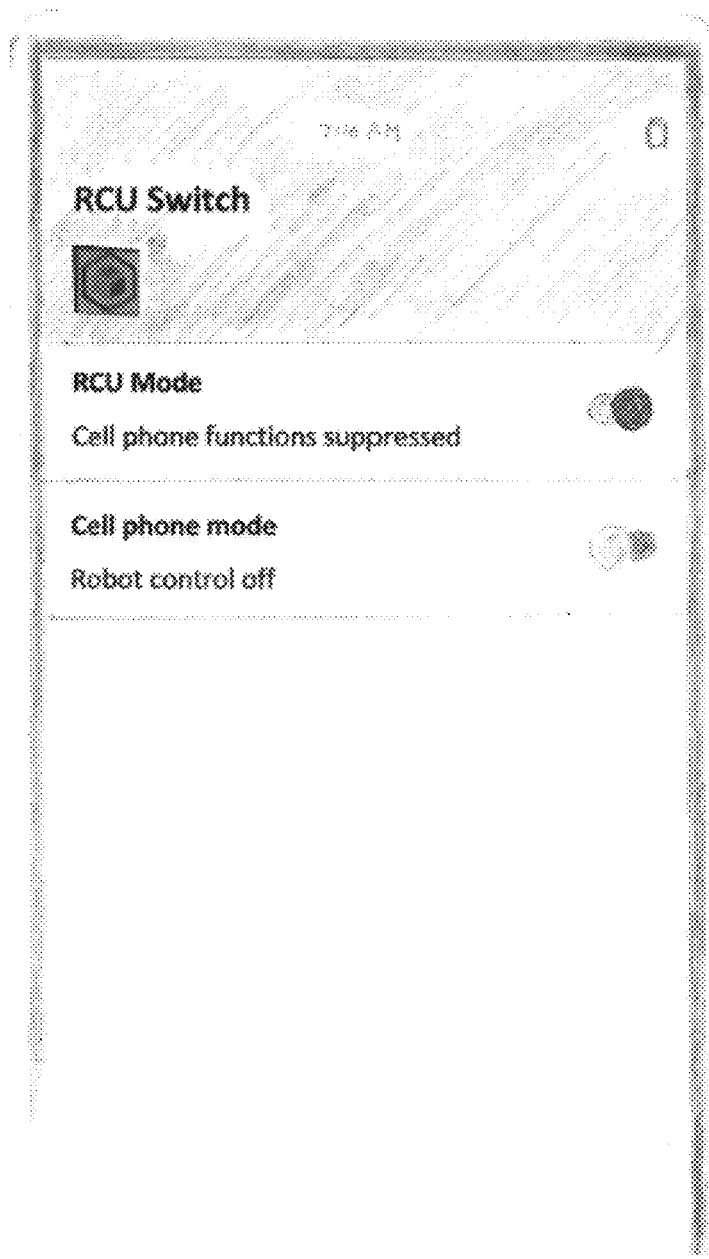
FIG. 9 illustrates a graphic user interface (GUI) for a robot control unit switch (RCU switch) according to one specific embodiment.

The mobile phone RCU device 1120 is configured to be able to switch between an RCU mode and a cell phone mode by means of an RCU switch, which comprises a graphic user interface (GUI) displayed on a touch control display panel of the mobile phone RCU device 1120 as illustrated in FIG. 9.

Specifically, the mobile phone RCU device 1120 is configured to be mounted onto the robot 1110, as illustrated in FIG. 11A, to have its RCU mode turned on to thereby allow a human-in-the-loop operator to control the robot 1110. The mobile phone RCU device 1120 is also configured to be used as a mobile phone when its cell phone mode is switched on.

The audio perception module in the audio-visual perception system substantially comprises an array of microphones (i.e. mic array), and each microphone 1122 in the mic array can be an outward/sideway facing omnidirectional microphone arranged on top of a rim of the mobile phone RCU apparatus. The mic array can reference to FIG. 6A, FIG. 6B and FIG. 6C and relevant descriptions in the above section. The visual perception module in the audio-visual perception system substantially comprises a front-facing camera 1121 (encircled with an oval with dotted line) with dual-lens capabilities, having one standard lens 11211 and one wide-angle lens 11212.

Figure 11B:
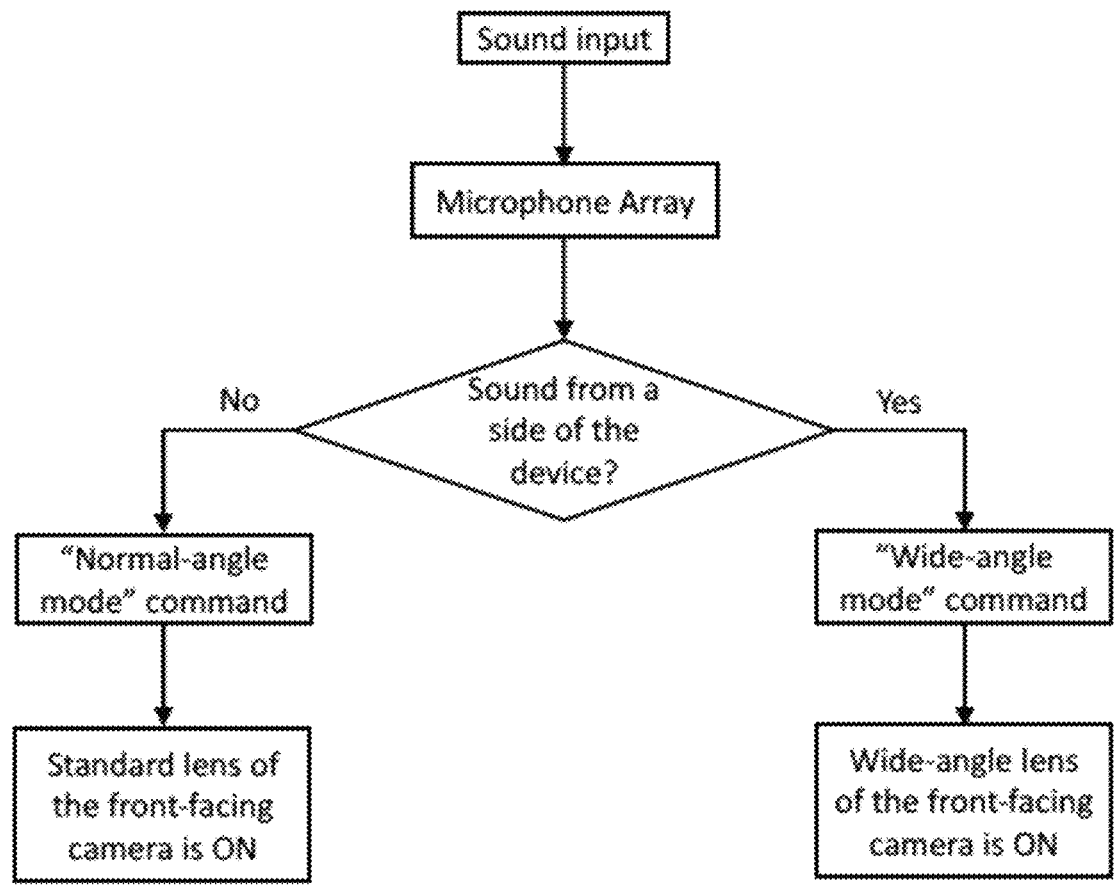
FIG. 11B shows a working process of the audio-visual perception system in the mobile phone RCU device illustrated in FIG. 11A.

FIG. 11B shows a working process of the audio-visual perception system in the mobile phone RCU device 1120 illustrated in FIG. 11A. As shown in the figure, the mic array (i.e. the audio perception module) of the audio-visual perception system can first receive a sound input from a speaker standing in a proximity of the mobile phone RCU apparatus. Then based on the sounds captured, the processing and control module of the audio-visual perception system can determine whether the speaker uttering the sound is standing to a side of the front-facing camera 1121 in the mobile phone RCU device 1120 mounted onto the robot 1110 (i.e. outside the immediate focus of the camera) or not (i.e. within the immediate focus).

If it is determined that the speaker is standing within the immediate focus, but not to the side of the front-facing camera 1121 in the mobile phone RCU device 1120, as shown in the left-ward "No" branch of the diamond "Sound from a side of the device" shown in FIG. 11B, the processing and control module of the audio-visual system can send a "normal-angle mode" command to the front-facing camera 1121 to activate a normal-angle working mode of the front-facing camera 1121 (i.e. turning on the standard lens 11211) to thereby realize a relatively better capture of images of the speaker standing within the normal angle relative to the mobile phone RCU device 1120 and to the robot 1110.

If, however, it is determined that the speaker is standing to the side of the front-facing camera 1121 in the mobile phone RCU device 1120, as shown in the right-ward "Yes" branch of the diamond "Sound from a side of the device" shown in FIG. 11B, the processing and control module of the audio-visual system can send a "wide-angle mode" command to the front-facing camera 1121 to switch on a wide-angle working mode of the front-facing camera 1121 (i.e. turning on the wide-angle lens 11212) to thereby realize a relatively better capture of images of the speaker standing to the side of the mobile phone RCU device 1120 and also to the side of the robot 1110.

By means of the mobile phone RCU device 1120 described herein, speakers standing to the side of the humanoid robot 1110 (and subsequently outside of the center focus of the plugged-in mobile phone RCU device 1120) can be seen and heard by a human-in-the-loop robot operator. Their facial expressions can be observed, their utterances can be clearly understood, which enables the human-in-the-loop robot operator to generate or support a natural dialog flow between the speakers and the robot.

As such, both audio and visual improvements, which are realized respectively through the microphone array 1122 and the dual-lens front-facing camera 1121 built in the mobile phone RCU device 1120, can enhance the audio and visual perception of the speakers standing in a surrounding of the robot 1110 having the mobile phone RCU device 1120 mounted thereon by the human-in-the-loop robot operator. For example, with the help of a handler, the mobile phone RCU device 1120 can be plugged onto a vest of the robot to thereby mount the mobile phone RCU device 1120 onto the robot.

Additionally, through the crosstalk between the audio perception module (i.e. the microphone array 1122) and the visual perception module (i.e. the dual-lens front-facing camera 1121), which is realized by the processing and control module in the audio-visual perception system in the mobile phone RCU device 1120, visual perception of the speakers by the human-in-the-loop robot operator can have an adaptive feature, without the need for handlers (which saves human resources). As such, it is practical to engage in spontaneous interaction by humans with the robot, relatively independent of where the human speaker is positioned relative to the robot. This enables the human (visitor/speaker) to completely and naturally engage with the humanoid form factor.

Embodiment 2

Figure 12A:
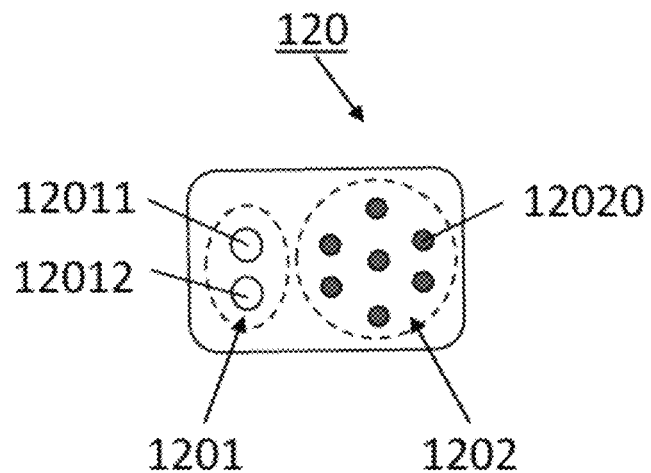
FIG. 12A illustrates an audio-visual perception apparatus equipped with an audio-visual perception system according to one specific embodiment of the disclosure.

FIG. 12A illustrates an audio-visual perception apparatus 120 used in a robot system according to some other embodiments of the disclosure. The audio-visual perception apparatus 120 herein can also be used as a robot control unit (RCU) apparatus mounted onto a robot and allowing a human-in-the-loop operator to control the robot, just like Embodiment 1, but can also be used as a means for a robot or machine to directly see and hear human speakers standing in the front thereof.

As shown in FIG. 12A, the audio-visual perception apparatus 120 comprises a visual perception module and an audio perception module. The visual perception module is substantially a front-facing camera 1201 configured to operate in two working modes: a far-field mode and a near-field mode, which is realized through a first lens 12011 and a second lens 12012 respectively. The audio perception module substantially comprises a microphone array 1202 comprising a plurality of microphones 12020 arranged in tandem and configured to work cooperatively.

Figure 12B:
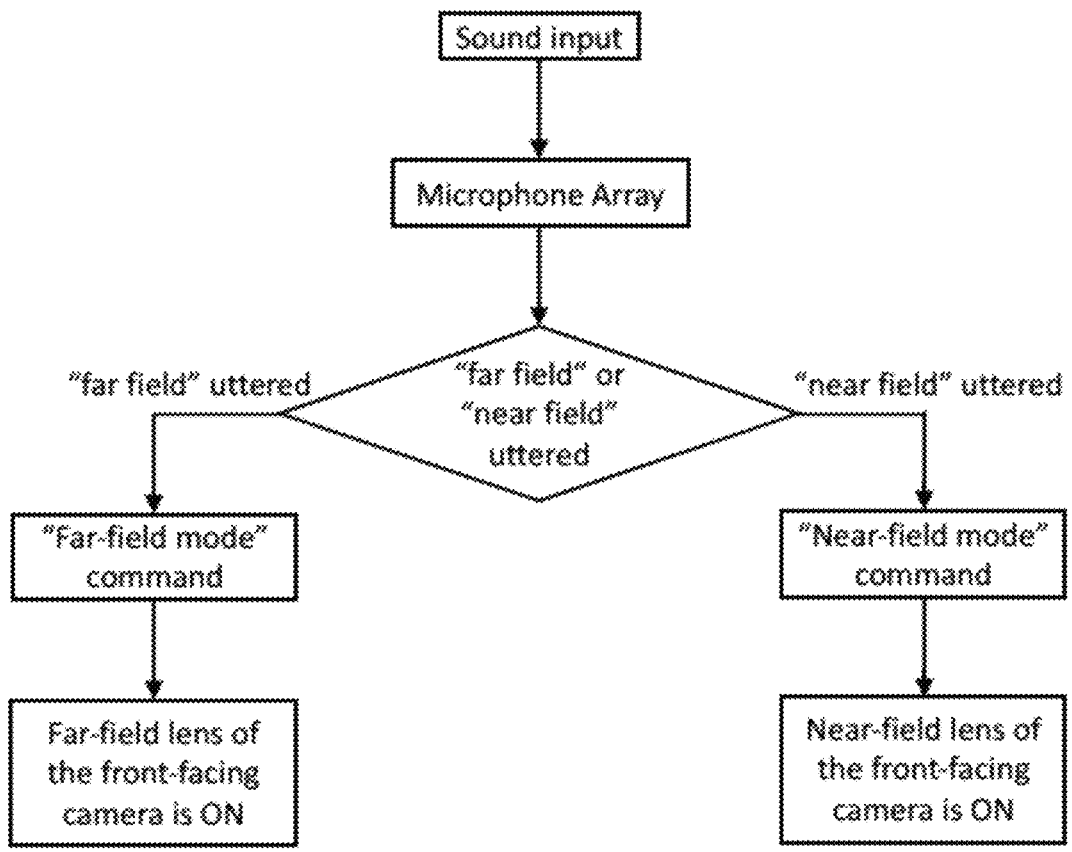
FIG. 12B shows a working process of the audio-visual perception apparatus shown in FIG. 12A.

As illustrated in a working process of this specific embodiment of the audio-visual perception apparatus 120 shown in FIG. 12B, the audio-visual system can switch between the two working modes of the visual perception module based on hot words uttered by a speaker standing in the front of the audio-visual perception apparatus 120.

Specifically for the audio-visual perception apparatus 120, the microphone array 1202 can first receive the sound inputs from the speaker, and then a processing and control module can determine, based on the sounds that have been recognized, which one of the two hot words (e.g. "far field" and "near field") is uttered by the speaker, If it is determined that the speaker utters the hot word "far field" (as shown by the left-ward branch of the diamond "far field or near field uttered" shown in FIG. 12B), then the processing and control module can send a "far-field mode" command to the front-facing camera 1201 to switch on a far-field working mode of the front-facing camera 1121 (i.e. turning on the far-field lens 12011) to thereby realize a relatively better capture of images of the speaker standing in a distance, and informing such, to the audio-visual perception apparatus 120.

If, however, it is determined that the speaker utters the hot word "near field"(as shown by the right-ward branch of the diamond "far field or near field uttered" shown in FIG. 12B), then the processing and control module can send a "near-field mode" command to the front-facing camera 1201 to switch on a near-field working mode of the front-facing camera 1121 (i.e. turning on the near-field lens 12012) to thereby realize a relatively better capture of images of the speaker standing in a close proximity, and informing such, to the audio-visual perception apparatus 120.

Embodiment 3

Figure 13A:
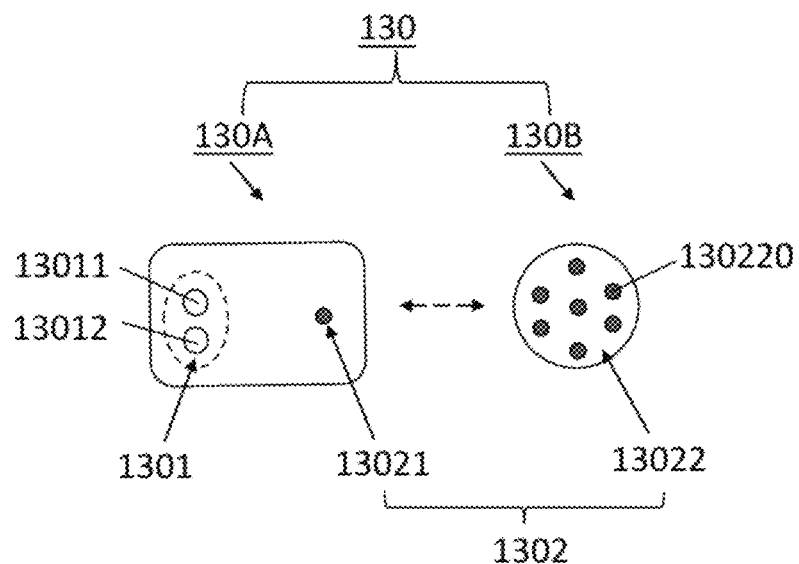
FIG. 13A illustrates an audio-visual perception apparatus equipped with an audio-visual perception system according to another specific embodiment of the disclosure.

FIG. 13A illustrates an audio-visual perception apparatus 130 used in a robot system according to yet some other embodiments of the disclosure. As shown in the figure, the audio-visual perception apparatus 130 substantially includes a first member 130A and a second member 130B, which are positionally separated yet functionally integrated, but can also be positionally and functionally integrated with each other.

The audio-visual perception apparatus 130 comprises a visual perception module 1301 and an audio perception module 1302. The visual perception module 1301 can include at least one camera (e.g. two cameras 13011 and 13012 illustrated in FIG. 13A), and the audio perception module 1302 can include a short-range microphone 13021 internally built in the first member 130A, and an ultra-sensitive and long-range microphone array 10322 in the second member 130B. As such, the camera(s) of the visual perception module 1301 and the short-range microphone 13021 of the audio perception module 1302 are together internally built in the first member 130A of the audio-visual perception apparatus 130, whereas the microphone array 13022 of the audio perception module 1302 is arranged in the second member 130B.

According to some embodiments, the first member 130A of the audio-visual perception apparatus 130 can be a robot control unit apparatus (such as the mobile phone RCU apparatus 20 illustrated in FIG. 1) mounted onto a robot for a human-in-the-loop robot operator to control the robot, and the second member 130B of the audio-visual perception apparatus 130 can be regarded as an auditory extension of the robot control unit apparatus (i.e. the first member 130A).

Figure 13B:
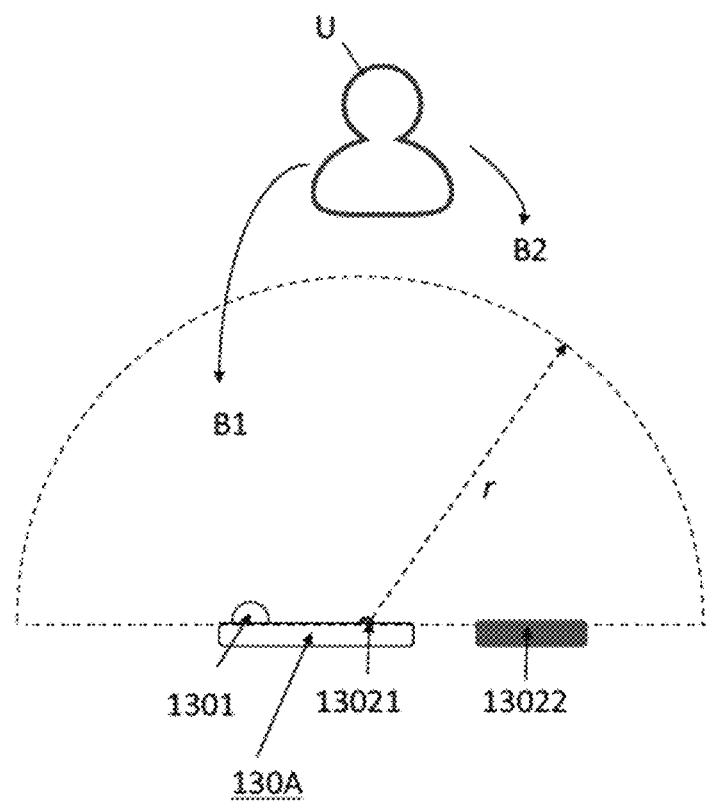
FIG. 13B shows the different working regions of the audio-visual perception apparatus shown in FIG. 13A.

As further illustrated in FIG. 13B, the short-range microphone 13021 of the audio perception module 1302 has a working region B1, defined by an area encircled by the half-circle having a radius r with the built-in microphone 13021 as center. The region outside the working region B1 is defined as B2.

Figure 13C:
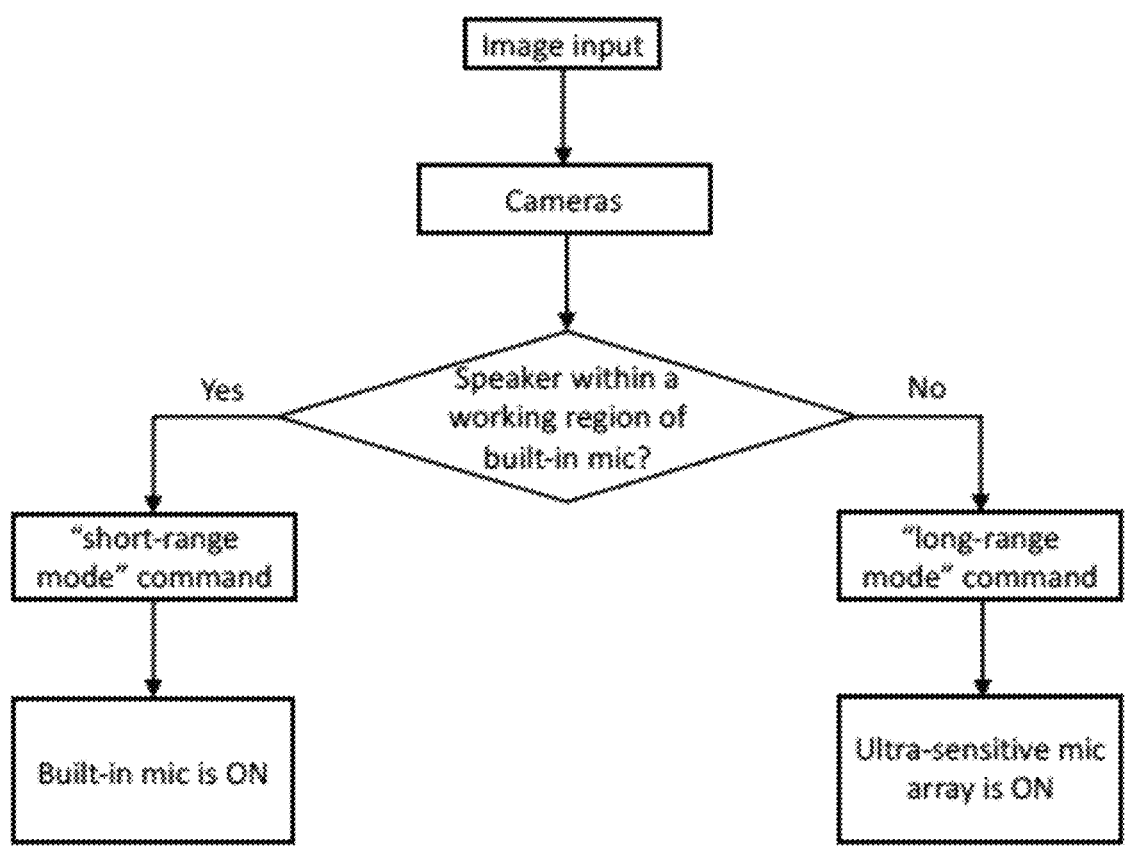
FIG. 13C shows a working process of the audio-visual perception apparatus shown in FIG. 13A.

FIG. 13C illustrates a working process of the audio-visual perception apparatus 130 shown in FIG. 13A and FIG. 13B. As shown in the FIGS. 13B and 13C, the visual perception module 1301 (i.e. internally built-in cameras 13011 and 13012) can receive images of a speaker U standing in front of the first member 130A of the audio-visual perception apparatus 130, and then based on the image input from the cameras, the processing and control module (not shown in the figure) can determine whether the speaker U is standing within the working region B1 of the built-in and short-range microphone 13021, or within the region B2.

If it is determined that the speaker U is standing within the working region B1 (as shown by the left-ward "Yes" branch of the diamond "Speaker within a working region of built-in mic?" shown in FIG. 13C), then the processing and control module can send a "short-range mode" command to the audio perception module 1302 to switch on a short-range working mode of thereof (i.e. turning on the built-in microphone 13021) to capture sounds of the speaker in a close proximity to the first member 130A of the audio-visual perception apparatus 130.

If, however, it is determined that the speaker U is standing outside the working region B1, or in the region B2 (as shown by the right-ward "No" branch of the diamond "Speaker within a working region of built-in mic?" shown in FIG. 13C), then the processing and control module can send a "long-range mode" command to the audio perception module 1302 to switch on a long-range working mode of thereof (i.e. turning on the ultra-sensitive microphone array 13022) to thereby realize a relatively better capture of sounds of the speaker in a distance to the first member 130A of the audio-visual perception apparatus 130.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An audio-visual perception system configured as a robot control unit (RCU) to control a robot for interaction with a subject, the audio-visual perception system comprising:
   an audio perception component configured to receive, and to convert into audio signals, sounds from the subject, wherein the audio perception component comprises:
      a first audio device that is an audio device built into the RCU that is configured to receive the sounds from the subject based on the subject being within a predetermined distance from the robot; and
      a second audio device separated by a distance from the robot, wherein the second audio device is configured to receive the sounds from the subject based on the subject being outside the predetermined distance from the robot;
   a visual perception component configured to receive, and to convert into visual signals, images of the subject; and
   a processing and control circuit communicatively coupled to each of the audio perception component and the visual perception component;
wherein:
   the visual perception component is a first perception component having more than one working mode; and
   the processing and control circuit is configured to control the first perception component to switch a working mode thereof based on sensory signals received from the audio perception component, wherein the sensory signals are the audio signals from the subject corresponding to the audio perception component.

2. The audio-visual perception system of claim 1, wherein the visual perception component comprises a normal-angle working mode and a wide-angle working mode,
   wherein the processing and control circuit is configured to control the visual perception component:
   to switch on the normal-angle working mode responsive to that the audio signals received from the audio perception component indicate that the subject is within a first pre-determined range corresponding to the normal-angle working mode; or
   to switch on the wide-angle working mode responsive to that the audio signals received from the audio perception component indicate that the subject is not within the first pre-determined range corresponding to the normal-angle working mode.

3. The audio-visual perception system of claim 1,
wherein the visual perception component comprises a near-field working mode and a far-field working mode,
wherein the processing and control circuit is configured to control the visual perception component:
to switch on the near-field working mode responsive to that the audio signals received from the audio perception component indicate that the subject is within a second pre-determined range corresponding to the near-field working mode; or
to switch on the far-field working mode responsive to that the audio signals received from the audio perception component indicate that the subject is not within the second pre-determined range corresponding to the normal-angle working mode.

4. The audio-visual perception system of claim 1,
wherein the audio perception component comprises a short-range working mode and a long-range working mode,
wherein the processing and control circuit is configured to control the audio perception component:
to switch on the short-range working mode responsive to that the visual signals received from the visual perception component indicate that the subject is within a third pre-determined range corresponding to the short-range working mode; or
to switch on the long-range working mode responsive to that the visual signals received from the visual perception component indicate that the subject is not within a third pre-determined range corresponding to the short-range working mode.

5. An audio-visual perception apparatus, comprising the audio-visual perception system according to claim 1.

6. The audio-visual perception apparatus of claim 5,
wherein the audio-visual perception apparatus has a mountable portion mounted onto the robot, and
wherein the audio-visual perception apparatus is configured to allow a human-in-the-loop robot operator to visually and audibly monitor the subject in a surrounding of the robot.

7. The audio-visual perception apparatus of claim 6, wherein the mountable portion is detachable from the robot and switchable between an RCU mode allowing robot control and a cell phone mode allowing cell phone functionalities, configured such that:
the RCU mode is turned on and the cell phone mode is suppressed responsive to that the mountable portion is mounted onto the robot; and
the cell phone mode is turned on and the RCU mode is turned off responsive to that the mountable portion is not mounted onto the robot.

8. The audio-visual perception apparatus of claim 7, further comprising a user interface, configured to allow a user to switch an operation of the RCU between the RCU mode and the cell phone mode.

9. The audio-visual perception apparatus of claim 6, wherein the visual perception component of the audio-visual perception system comprises a first camera device arranged on the mountable portion, and the first audio device comprises a first microphone device arranged on the mountable portion.

10. The audio-visual perception apparatus of claim 9, wherein the visual perception component of the audio-visual perception system further comprises a second camera device positionally separated from, yet communicatively coupled with, the mountable portion.

11. The audio-visual perception apparatus of claim 9, wherein the first microphone device comprises a first microphone array having a plurality of first microphones, arranged respectively at different positions of the mountable portion.

12. The audio-visual perception apparatus of claim 11, wherein each of the plurality of first microphones in the first microphone array is an omnidirectional microphone arranged on top of a rim of the mountable portion and configured to be outward-facing or sideway-facing.

13. The audio-visual perception apparatus of claim 9, wherein the second audio device has a sensitivity that is greater than a sensitivity of the first audio device and comprises a second microphone device positionally separated from, yet communicatively coupled with, the mountable portion, wherein the second microphone device comprises a second microphone array having a plurality of second microphones.

14. The audio-visual perception apparatus of claim 9, wherein:
the first camera device comprises a normal-angle lens and a wide-angle lens;
the first microphone device is configured to allow a determination whether a sound source is within a normal-angle range, or within a wide-angle range, of the first camera device on the mountable portion, based on a sound therefrom; and
the processing and control circuit of the audio-visual perception system is configured:
to send a first command to the first camera device to thereby switch on the normal-angle lens responsive to that the audio signals received from the first microphone device indicate that the subject is within the normal-angle range; or to send a second command to the first camera device to thereby switch on the wide-angle lens responsive to that the audio signals received from the first microphone device indicate that the subject is not within the normal-angle range.

15. The audio-visual perception apparatus of claim 9, wherein:
the first camera device comprises a near-field lens and a far-field lens;
the first microphone device is configured to allow a determination whether a sound source is within a near-field range, or within a far-field range, of the first camera device on the mounting device, based on a sound therefrom; and
the processing and control circuit of the audio-visual perception system is configured:
to send a third command to the first camera device to thereby switch on the near-field lens if the audio signals received from the first microphone device indicate that the subject is within the near-field range; or
to send a fourth command to the first camera device to thereby switch on the far-field lens if otherwise.

16. The audio-visual perception apparatus of claim 13, wherein:
the first microphone device and the second microphone device are respectively configured to operate in a short range and in a long range respectively;
the first camera device is configured to allow a determination whether an object is within the short range of the first microphone device, based on an image thereof;

and the processing and control circuit of the audio-visual perception system is configured:

to send a fifth command to thereby switch on the first microphone device responsive to that the visual signals received from the first camera device indicate that the subject is within the short range; or to send a sixth command to the second microphone device to thereby switch on the second microphone device responsive to that the visual signals received from the first camera device indicate that the subject is not within the short range.

17. A robot system, comprising the audio-visual perception apparatus according to claim 6, and the robot.

18. The robot system of claim 17, further comprising a mounting device, configured to mediate mounting of a mountable portion of the audio-visual perception apparatus to be mounted onto, or detached off from, the robot.

19. The robot system of claim 18, wherein the mounting device comprises:

a first connecting part, attached with the robot; and a second connecting part, attached with the first connecting part and configured to securely hold the mountable portion of the audio-visual perception apparatus yet without influencing functionality of the audio-visual system.

20. The robot system of claim 19, wherein:

the audio-visual system comprises a first camera device and a first microphone device, both arranged on the mountable portion; and the second connecting part of the mounting device comprises a clamp, wherein the clamp comprises at least one clamping piece, configured such that none of the at least one clamping piece obstructs any lens of the first camera device or any microphone of the first microphone device.

* * * * *